(12) United States Patent
Ito

(10) Patent No.: US 6,729,730 B2
(45) Date of Patent: May 4, 2004

(54) PROJECTOR

(75) Inventor: Yoshitaka Ito, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/196,249

(22) Filed: Jul. 17, 2002

(65) Prior Publication Data

US 2002/0180933 A1 Dec. 5, 2002

Related U.S. Application Data

(63) Continuation of application No. 09/774,796, filed on Feb. 1, 2001, now abandoned.

(30) Foreign Application Priority Data

Feb. 4, 2000 (JP) .......................................... 2000-028369

(51) Int. Cl.[7] ........................ G03B 21/14; G03B 21/00; G03B 21/20; G02F 1/1335

(52) U.S. Cl. ........................ 353/20; 353/31; 353/102; 349/9

(58) Field of Search ................................ 349/5, 6, 7, 9, 349/10; 353/30, 31, 32, 33, 102, 37, 38, 20; 348/744, 745, 751, 752

(56) References Cited

U.S. PATENT DOCUMENTS

| | | | |
|---|---|---|---|
| 5,325,218 A | 6/1994 | Willett et al. .................. 359/53 |
| 6,139,157 A | 10/2000 | Okuyama ..................... 353/102 |
| 6,231,193 B1 | 5/2001 | Sugawara .................... 353/102 |
| 6,247,816 B1 | 6/2001 | Cipolla et al. ................. 353/31 |
| 6,273,569 B1 | 8/2001 | Iechika et al. ................. 353/38 |
| 6,292,234 B1 | 9/2001 | Miyake et al. ............... 348/766 |
| 6,322,219 B1 | 11/2001 | Okamori et al. ............... 353/98 |
| 6,331,060 B1 * | 12/2001 | Yamamoto et al. ........... 353/31 |
| 6,343,864 B1 * | 2/2002 | Tajiri ............................ 353/20 |
| 6,373,629 B1 * | 4/2002 | Yamagishi et al. ......... 359/487 |
| 6,457,832 B1 * | 10/2002 | Okuyama ..................... 353/38 |
| 6,478,429 B1 * | 11/2002 | Aritake et al. ................. 353/31 |

FOREIGN PATENT DOCUMENTS

| | | | |
|---|---|---|---|
| EP | 0848274 A1 | 6/1998 | .......... G02B/27/28 |
| EP | 0905542 A2 | 3/1999 | .......... G02B/27/28 |
| JP | A-8-34127 | 2/1996 | .......... B41J/2/325 |
| JP | 08-304739 | 11/1996 | .......... G02B/27/28 |
| JP | A-10-232430 | 9/1998 | .......... G03B/15/00 |
| JP | 11-231262 | 8/1999 | .......... G02B/27/28 |
| TW | 239191 | 6/1991 | .......... G02B/27/00 |
| TW | 82100206 | 5/1994 | |

* cited by examiner

*Primary Examiner*—Russell Adams
*Assistant Examiner*—Melissa J Koval
(74) *Attorney, Agent, or Firm*—Oliff & Berridge, PLC

(57) ABSTRACT

A projector is provided which can realize a bright projected image of high light utilization efficiency while combining a reflective-type liquid crystal device and an integrator optical system. The projector may include a light source lamp, a light beam dividing optical element, a polarization conversion element, a polarization selection element having a polarization selection surface, and an electro-optical device. When a plane of incidence including a normal line of the polarization selection surface and the central axis of an incident light is assumed, the direction parallel to the plane of incidence and perpendicularly intersecting the central axis is assumed to be the X-axis direction, and the direction perpendicularly intersecting the plane of incidence is assumed to be the Y-axis direction, the direction of polarization beam separation by the polarization conversion element is the X-axis direction.

18 Claims, 13 Drawing Sheets

PROJECTOR

This is a Continuation of application Ser. No. 09/774,796 filed Feb. 1, 2001 now abandoned. The entire disclosure of the prior application(s) is hereby incorporated by reference herein in its entirety.

BACKGROUND OF THE INVENTION

1. Field of Invention

The present invention relates to a projector which divides light from a light source into a plurality of partial light beams, which converts the plurality of partial light beams into one type of polarized light beam polarized in substantially the same direction by a polarization conversion element, which changes the polarized state of the polarized light beam by an electro-optical device, which selects a state by a polarization selection element to form an optical image according to image information, and which enlarges and projects the optical image.

2. Description of Related Art

Recently, attention has been focused on projectors using a reflective-type liquid crystal device. In such a reflective-type liquid crystal device, the pixel density can be increased by forming a structure, such as a transistor, for driving liquid crystal under a reflecting mirror. Therefore, the reflective-type liquid crystal device has the advantage of realizing a clear projected image with high resolution, compared with the case where a transmissive liquid crystal device is used.

In addition, in projectors using an electro-optical device, such as a liquid crystal device, in order to reduce the size of the entire device while realizing a bright projected image without display nonuniformity, the use of an integrator optical system or a polarization conversion element has been proposed (Japanese Unexamined Patent Application Publication No. 8-34127, and Japanese Unexamined Patent Application Publication No. 10-232430, etc.). In the integrator optical system, light from a light source is divided by a light beam dividing optical element into a plurality of partial light beams to form a plurality of light source images, the light source images are considered as dummy light sources, and light from the plurality of light source images is superposed on a liquid crystal panel, whereby illumination light having a uniform intensity distribution can be obtained. In the polarization conversion element, light from a light source is divided into a plurality of partial light beams to perform polarization conversion and then, the light is superimposed on a liquid crystal device, whereby illumination light polarized in the same direction is obtained.

For this reason, it is thought that a brighter projected image with high resolution and without display nonuniformity can be realized if the integrator optical system and the polarization conversion element are used in combination in the projector using the reflective-type liquid crystal device.

SUMMARY OF THE INVENTION

When a reflective-type liquid crystal device utilizing a polarization mode as a display mode is used in a projector, a polarization selection element (for example, a polarization beam splitter) for spatially separating and selecting light of different polarization states is generally used, but the polarization selecting characteristic of the polarization selection element has strong incident-angle-dependency. More specifically, in the case where a plane of incidence including a nearly central axis of the incident light and a normal line of a polarization selection surface of the polarization selection element is defined, if the incident angle of light is increased in a plane perpendicularly intersecting the plane of incidence, the polarization selectivity is substantially reduced. Since this phenomenon greatly depends on a geometrical positional relationship between a polarization selection surface and the light entering there, it is very difficult to prevent the substantial reduction in the polarization selectivity. On the other hand, if the incident angle of light is increased at the plane of incidence, the polarization selectivity is also reduced, but the degree of reduction is relatively small as compared to that in the plane perpendicularly intersecting the plane of incidence, and the reduction in the polarization selectivity can be prevented by arranging the configuration of the polarization selection surface. Therefore, in order to at least improve the polarization selectivity of the polarization selection element, it is important to reduce the incident angle of light in the plane perpendicularly intersecting the plane of incidence as much as possible, for example.

In addition, the optical system employing the integrator optical system or the polarization conversion element, by reason of its optical process, cannot avoid the phenomenon in which the angular distribution of the incident angle of illumination light expands.

For this reason, in the case where the integrator optical system and the polarization conversion element are used in combination in the projector using the reflective-type liquid crystal device, since the incident angle of light entering the polarization selection surface is increased, the polarization selectivity of the polarization selection surface is reduced, causing a problem in that light utilization efficiency is reduced and non-uniform brightness occurs.

It is one object of the present invention to at least provide a projector which can realize a bright projected image with high light utilization efficiency and high quality while combining a reflective-type liquid crystal device and an integrator optical system or a polarization conversion element.

The projector according to the present invention achieves at least the above object by, for example, arranging a direction of polarization beam separation and characteristics of a light beam dividing optical element.

(1) The projector according to one exemplary embodiment of the present invention is a projector including a light beam dividing optical element for dividing light from a light source into a plurality of partial light beams; a polarization conversion element for converting the plurality of partial light beams into one type of polarized light beam polarized substantially in the same directions; an electro-optical device for modulating an illumination light beam emitted from the polarization conversion element; a projection lens for projecting light modulated by the electro-optical device; and a polarization selection surface for selecting light of a predetermined polarized component included in the illumination light beam and emitting the light toward the electro-optical device, and for selecting light of a predetermined polarized component in the light modulated by the electro-optical device and emitting the light toward the projection lens. In the projector, when a plane of incidence including a normal line of the polarization selection surface and the central axis of the illumination light beam is assumed, the direction parallel to the plane of incidence and perpendicularly intersecting the central axis is defined as the X-axis direction, and the direction perpendicularly intersecting the plane of incidence is defined as the Y-axis direction, the direction of polarization beam separation by the polarization conversion element is the X-axis direction.

According to the exemplary embodiment as described above, the polarization beam separability of the polarization selection surface has strong incident-angle-dependency to an incident light beam. In particular, when an incident angle of light is increased in the Y-axis direction perpendicularly intersecting the plane of incidence, the polarization selectivity is remarkably reduced. On the other hand, in the polarization conversion element, since two types of polarized light beams polarized in different directions are produced from the partial light beams, the width of each partial light beam substantially doubles in the direction of separation, and the angular distribution of the light expands. Thus, in order to improve the polarization selectivity in the polarization selection element, it is important to consider the incident-angle-dependency of the polarization selectivity and the spread of the angular distribution of the light incident thereon.

According to this exemplary embodiment, since the direction of polarization beam separation in the polarization conversion element is the X-axis direction, an increase in the incident angle of light in the Y-axis direction incident on the polarization selection surface can be restrained. Thus, the polarization selectivity can be maintained in a relatively high state, making it possible to realize a bright projected image having a high contrast ratio.

(2) As the electro-optical device, for example, a reflective-type liquid crystal device disposed at a position on which either light transmitted or reflected by the polarization selection surface is incident, modulating the incident light, and emitting the modulated light from the plane of incidence of the light, may be adopted.

(3) The light beam dividing optical element may preferably be configured so as to narrow the spacings of the plurality of light source images in the Y-axis direction.

That is, since the increase in the incident angle of light in the Y-axis direction can be further restrained by narrowing the spacings of the light source images in the Y-axis direction, the polarization selectivity of the polarization selection surface can be maintained in a very high state, making it possible to realize a very bright projected image having a high contrast ratio.

(3-1) As the light beam dividing optical element, a rod for reflecting light incident from an incident end surface at plural pairs of reflection surfaces, dividing the light according to differences in reflection positions, and emitting the light as a plurality of partial light beams from an emission end surface, can be adopted.

As the rod, a solid one (solid rod) consisting of light-guiding material, or a hollow one (hollow rod) having a light reflecting surface formed on the inside surface of a cylindrical member can be adopted. In the case of the solid rod, light is totally reflected by the reflecting surface without optical loss, so that the light utilization efficiency can be further increased. In the case of the hollow rod, since light incident from the incident end surface reaches the emission end surface via an air layer in the rod, uniform illumination light can be realized even if the size between the incident end surface and the emission end surface is set to be relatively short, and further, the hollow rod is manufactured more easily than the solid rod.

When the solid rod or the hollow rod is adopted, it may include at least two sets of reflecting surfaces opposing in the X-axis direction and in the Y-axis direction, and the cross section of the rod can be formed into a polygon of a tetragon or more, such as an octagon, a dodecagon, or the like.

However, if the light transmission efficiency from the light source to the light beam dividing optical element is considered, since the light incident on the light beam dividing optical element from the light source has a substantially circular cross section, the incident end surface of the rod may preferably be formed in a square shape. In addition, if the illuminating efficiency to the subsequently disposed electro-optical device is considered, since an image formed on the emission end surface of the rod is superimposed on a display area of the electro-optical device that is one area to be illuminated, the emission end surface of the rod may preferably have the shape substantially similar to the shape of the display area of the electro-optical device.

In the case of adopting the above-described rod as the light beam dividing optical element, the spacings of the light source images in the Y-axis direction can be narrowed by disposing the rod so that a spacing of a pair of the reflecting surfaces opposing in the Y-axis direction is gradually widened from the incident end surface toward the emission end surface.

Furthermore, the rod may be disposed so that a spacing of a pair of reflecting surfaces opposing in the X-axis direction is gradually narrowed from the incident end surface toward the emission end surface of the rod. In this case, since the disposition spacings of the light source images in the X-axis direction can be widened, the spacings between the polarization beam separation films and the reflecting films of the polarization conversion element can be set in sufficient consideration of the sizes of the light source images. Thus, the polarization conversion efficiency in the polarization conversion element can be increased, and consequently, making it possible to increase the light utilization efficiency in the projector.

(3-2) As the light beam dividing optical element, a lens array composed of a plurality of condenser lenses aligned in the X-axis direction and the Y-axis direction can be also adopted.

In this case, it is possible to narrow the spacings of the plurality of light source images in the Y-axis direction by designing the light collecting characteristics of the plurality of condenser lenses. As the condenser lenses constituting the lens array, hologram lenses or diffraction lenses for condensing light by a holographic effect or diffraction can be also adopted in addition to a general lens.

In addition, since the images formed on the condenser lenses of the lens array are superimposed on a display area of the electro-optical device that is one area to be illuminated, the condenser lenses may preferably have the shapes substantially similar to the shape of the display area of the electro-optical device. This can increase the illumination efficiency.

In addition, a part of or all of the plurality of the condenser lenses constituting the lens array may preferably be a decentered lens.

That is, since the light source images can be formed at positions other than the physical centers of the condenser lenses by forming a part of or all of the condenser lenses with the decentered lens, the spacings of the plurality of light source images formed on a virtual plane can be freely controlled.

(4) When the lens array is adopted as the light beam dividing optical element, a reducing optical system may preferably be disposed on an optical path provided between the light source and the polarization conversion element. By reducing the overall cross sectional size of the illumination light with the reducing optical system, the increase in the incident angle of light in the Y-axis direction can be further restrained.

By the disposition of such a reducing optical system, the overall cross sectional size of the illumination light can be reduced in the Y-axis direction. For this reason, the increase in the incident angle of light in the Y-axis direction can be further restrained, and the polarization selectivity of the polarization selection surface can be maintained in a very high state. Therefore, it is possible to realize a very bright projected image having high contrast ratio. In addition, since the overall diameter of the light beam illuminating the area to be illuminated can be reduced, an expensive lens having the small F-number does not have to be adopted as the projection lens. Therefore, a reduction in the cost of the projector can be realized.

In this case, not only the cross sectional size in the Y-axis direction, but also the cross sectional size in the X-axis direction may be reduced. In this case, it is possible to maintain the polarization selectivity of the polarization selection surface in a higher state.

Such a reducing optical system can be constituted by at least one convex lens disposed on one of the incident side and the emission side of the lens array, and at least one concave lens disposed on the incident side of the polarization selection element. In this case, in the case where only the cross sectional size in the Y-axis direction of the illumination light beam is reduced, cylindrical lenses can be used as the concave lens and the convex lens. While the convex lens and the concave lens can be constituted by one lens member, respectively, they may preferably be a combined lens formed by a combination of a plurality of lenses if the reduction in the optical aberration is considered.

(5) In the above projector, a reducing optical system for reducing the cross sectional size of the illumination light in the Y-direction can be disposed between the polarization conversion element and the polarization selection element.

While the reducing optical system can be constituted by one concave lens, it can be also constituted by a combined lens formed by a combination of a plurality of lenses. If the reduction in the optical aberration is considered, the combined lens may preferably be adopted. In this case, cylindrical lenses can be used as the convex lens and the concave lens.

By the adoption of such a reducing optical system, the same advantages as in the case of (4) can be also obtained.

In addition, in this case, not only the cross sectional size of the illumination light in the Y-axis direction, but also the cross sectional size in the X-axis direction may be reduced. In this case, general axisymmetric curved lenses can be used as the concave lens and the convex lens.

The convex lens and the concave lens constituting a series of the above reducing optical systems may be hologram lenses or diffraction lenses for condensing light by a holographic effect or diffraction, in addition to general lenses having surfaces formed into curved shapes.

(6) As the polarization conversion element, a polarization conversion element including a polarization beam separation film for transmitting one polarized light beam and for reflecting the other polarized light beam in two types of polarized light beams, a reflecting film for reflecting the other polarized light beam, and a retardation film for unifying the directions of polarization of the two types of polarized light beams in order to unify the directions of emission of the two types of the polarized light beams, may preferably be adopted.

BRIEF DESCRIPTION OF THE DRAWINGS

FIGS. 3(a)–(b) include diagrams, each showing the configuration of a polarization conversion element in the embodiment, in which FIG. 3(a) is a horizontal sectional view, and FIG. 3(b) is an outward perspective view;

FIGS. 9(a)–(b) show the schematic configuration of a sixth exemplary embodiment of the projector of the present invention, in which FIG. 9(a) is a vertical sectional view as seen from the X-axis direction, and FIG. 9(b) is a horizontal sectional view as seen from the Y-axis direction;

FIGS. 11(a)–(b) include diagrams, each showing the schematic configuration of an eighth exemplary embodiment of the projector of the present invention, in which FIG. 11(a) is a vertical sectional view as seen from the X-axis direction, and FIG. 11(b) is a horizontal sectional view as seen from the Y-axis direction;

DETAILED DESCRIPTION OF PREFERRED EMBODIMENTS

Figure 1:
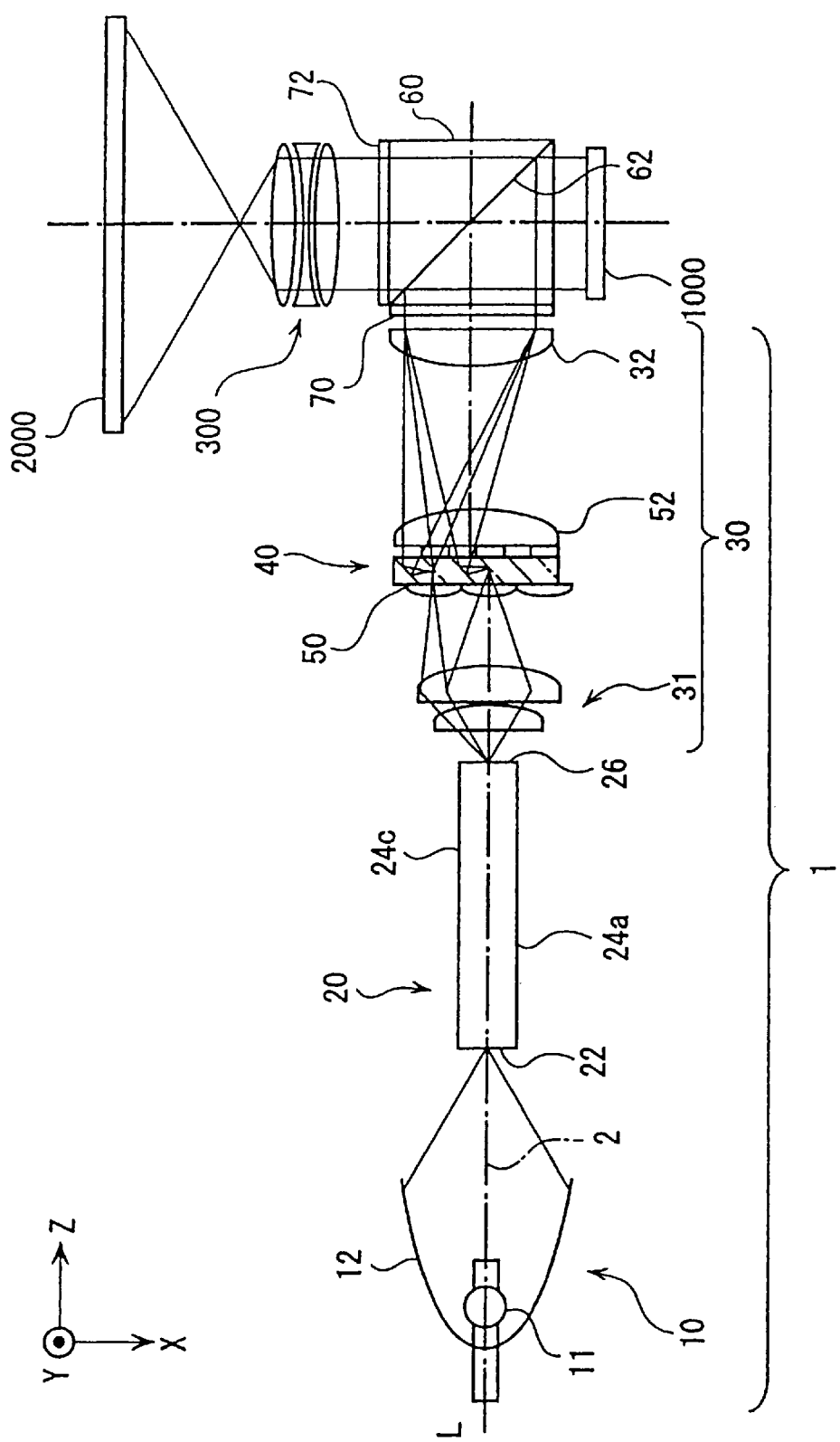
FIG. 1 is a schematic plan view showing a first exemplary embodiment of a projector of the present invention.

The exemplary embodiments of the present invention will now be described with reference to the drawings. In the following description, the Z-axis direction represents the direction of light propagation, the Y-axis direction represents the direction of twelve o'clock (direction perpendicularly intersecting the plane of the figure in FIG. 1) from the direction of light propagation, and the X-axis direction represents the direction of three o'clock from the direction of light propagation. In FIG. 1 to FIG. 13, the same components are denoted by the same reference numerals.

A. First Embodiment

FIG. 1 is a schematic plan view showing a first exemplary embodiment of a projector of the present invention.

The projector includes an illuminating device 1, a polarization beam splitter 60 which may include a polarization selection surface, a liquid crystal device 1000 serving as an electro-optical device, and a projection lens 300. The configuration of the projector is such that light emitted from the illuminating device 1 is modulated by the liquid crystal device 1000 according to image information, and is enlarged and projected by the projection lens 300 so as to form an projected image on a projection plane 2000.

1. Illuminating Device

The illuminating device 1 may include a light source lamp 10 disposed along an imaginary illumination optical axis L, a rod 20 serving as a light beam dividing optical element for dividing light from the light source lamp 10 into a plurality of partial light beams forming a plurality of light source images, a relay optical system 30 for transmitting an image on an emission end surface 26 of the rod 20 to an area to be illuminated, and a polarization conversion element 40 disposed in the relay optical system 30 to perform polarization beam separation and polarization conversion. The area to be illuminated is formed by the liquid crystal device 1000 serving as an example of the electro-optical device for producing an image by optical modulation. The shape of a display plane of the liquid crystal device 1000 in this embodiment is assumed to be the shape of square in which the size in the X-axis direction is equal to the size in the Y-axis direction.

1-1 Light Source Lamp

The light source lamp 10 may include a light source 11 for radially emitting light beams, and an elliptical reflector 12 for collecting the light emitted from the light source 11. One of two focal points of the elliptical reflector 12 is set to be positioned at the light source 11 or in the vicinity thereof, and the other focal point is set to be positioned on an incident end surface 22 of the rod 20 or in the vicinity thereof. The light emitted from the light source 11 is condensed near the incident end surface 22 of the rod 20 by the elliptical reflector 12, and enters the rod 20 in the condensed state. A parabolic reflector or a spherical reflector may be used instead of the elliptical reflector 12. In this case, however, it is necessary to install a condenser element for condensing nearly parallel light emitted from the reflector toward the incident end surface 22 of the rod 20 on the emission side of the reflector.

1-2 Light Beam Dividing Optical Element

The rod 20 serving as the light beam dividing optical element is a member for dividing the light from the light source lamp 10 into a plurality of partial light beams to form a plurality of light source images S positioned in the X-Y plane approximately in a matrix.

Figure 2:
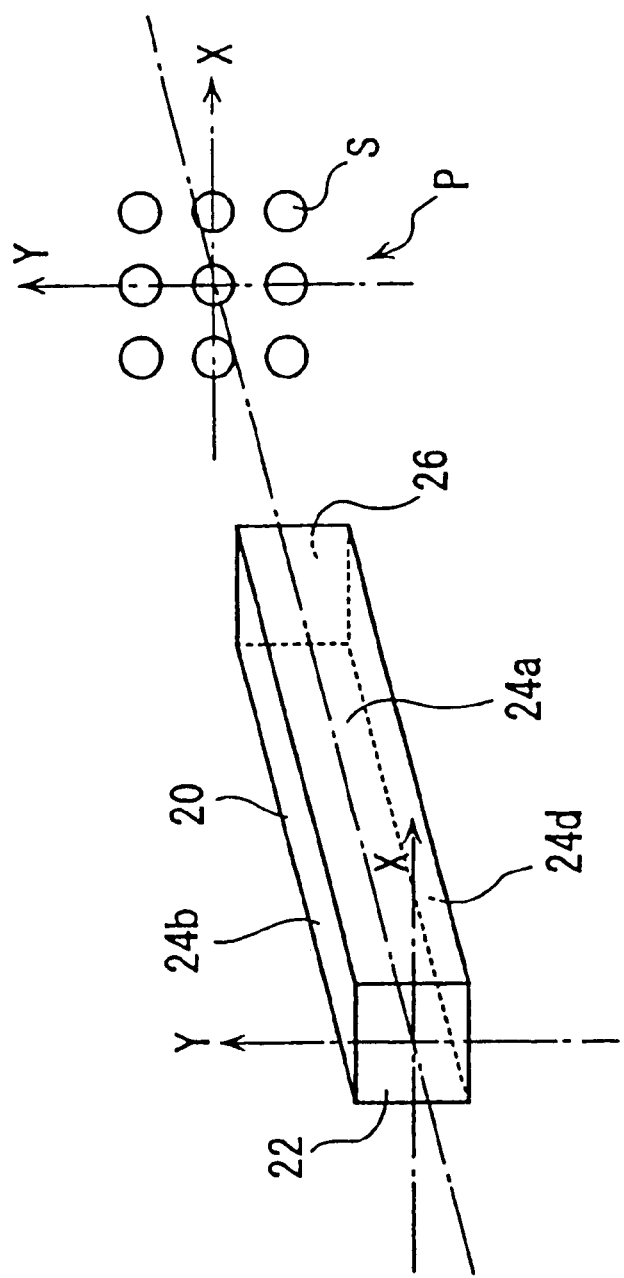
FIG. 2 is a schematic perspective view showing the relationship between a rod and positions of light source images S in the embodiment.

The rod 20 is a bar-like solid rod formed by a transparent light-guiding material, such as a glass material, and is a hexahedron. The rod 20 includes the incident end surface 22 where the light enters, four reflection surfaces 24a, 24b, 24c, and 24d for reflecting and transmitting light, and the emission end surface 26 from which the transmitted light is emitted, as shown in FIG. 2. In this case, since total reflection without optical loss is effected and light is transmitted utilizing it on the four reflection surfaces 24a, 24b, 24c, and 24d, the rod 20 can realize a high light-transmission efficiency.

The cross sections of both the incident end surface 22 and the emission end surface 26 on the X-Y plane have rectangular shapes. In particular, in the case of this embodiment, the incident end surface 22 and the emission end surface 26 are formed to have shapes substantially similar to the shape of the display area of the liquid crystal device 1000 that is an area to be illuminated, that is, formed in the shape of square, respectively. The reflection surface 24a and the reflection surface 24c are parallel to each other, and the reflection surface 24b and the reflection surface 24d are parallel to each other. The light incident on the rod 20 is divided into a plurality of partial light beams having different emission angles from the emission end surface 26 according to differences in reflection positions and the number of reflection at the reflection surfaces 24a, 24b, 24c, and 24d.

The plurality of partial light beams emitted from the rod 20 at different angles are condensed by a condenser lens 31, and form the plurality of the light source images S approximately in a matrix in the X-Y plane which is nearly parallel to the emission end surface 26 and perpendicularly intersecting the illumination optical axis L at a position separated from the rod 20 by a predetermined distance. The X-Y plane on which the plurality of light source images S are formed is referred to as a virtual plane P.

On the virtual plane P on which the plurality of light source images S are formed or in the vicinity thereof, a first transmission lens 50, a polarization conversion element 40, and a second transmission lens 52 are disposed, as shown in FIG. 1.

1-3 Polarization Conversion Element

The polarization conversion element 40 has the function of converting incident light into predetermined linear polarized light beams, FIG. 3(*a*) is a horizontal sectional view for explaining the configuration thereof, and FIG. 3(*b*) is an outward perspective view.

The polarization conversion element 40 formed by including a plurality of light-transmissive members 41A and 41B, a plurality of polarization beam separation films 42 and reflecting films 44 alternately disposed between the light-transmissive members, and retardation films 48 that are polarization direction-rotating means provided at positions corresponding to the polarization beam separation films 42. The polarization conversion element 40 is formed by alternately bonding the light-transmissive member 41A having the polarization beam separation films 42 and the reflecting surfaces 44 formed thereon with the light-transmissive member 41B having no polarization beam separation films 42 and the reflecting films 44 formed thereon by an adhesive agent, and then by bonding the retardation films 48 to the light-transmissive member 41B. This X-axis direction corresponds to the X-axis direction, and the Y-axis direction corresponds to the Y-axis direction. All the polarization beam separation films 42 and the reflecting films 44 are not necessarily aligned in the same direction. For example, they can be placed so that the adjacent light-transmissive members 41A and 41B are folded and positioned using the Y-Z plane as a plane of symmetry. While all the spacings between the polarization beam separation films 42 and the reflecting films 44 are equal in this embodiment, they may be different.

For conveniences, in the surface of the polarization conversion element 40 on the side of incidence of light, a surface directly corresponding to the polarization beam separation film 42 is referred to as a "surface of incidence 45A", and a surface directly corresponding to the reflecting film 44 is referred to as a "surface of incidence 45B". Similarly, in the surface on the side of emission of light, a surface directly corresponding to the polarization beam separation film 42 is referred to as an "emission surface 46A", and a surface directly corresponding to the reflecting film 44 is referred to as an "emission surface 46B". Since the light-transmissive members 41A and 41B are disposed as described above, a plurality of the surfaces of incidence 45A and the surfaces of incidence 45B are alternately formed at predetermined spacings along a direction of polarization beam separation in the polarization beam separation film 42, that is, along the X-axis direction. Similarly, a plurality of the emission surfaces 46A and the emission surfaces 46B are alternately formed at predetermined spacings along the X-axis direction.

The polarization beam separation films 42 have the function of spatially separating incident unpolarized light into two types of linear polarized light beams whose directions of polarization approximately perpendicularly intersect. That is, light incident on the polarization beam separation films 42 is separated into a first linear polarized light beam that is transmitted light transmitted by the polarization beam separation films 42, and a second linear polarized light beam that is a reflected light reflected by the polarization beam separation films 42 and a direction of propagation thereof is bent by approximately 90 degrees. In this embodiment, the first linear polarized light beam is p-polarized light beam, and the second linear polarized light beam is s-polarized light beam, and the polarization beam separation films 42 are formed to have characteristics and angles so that the s-polarized light beam, which is reflected light, is reflected nearly in parallel with the X-axis direction. The polarization beam separation films 42 can be realized by dielectric multilayer films.

The reflecting films 44 have the function of reflecting the reflected light from the polarization beam separation films 42 again and directing the light toward the substantially same direction as the direction of propagation of the transmitted light. The reflecting film 44 can be realized by dielectric multilayer films or aluminum films.

Figure 3A:
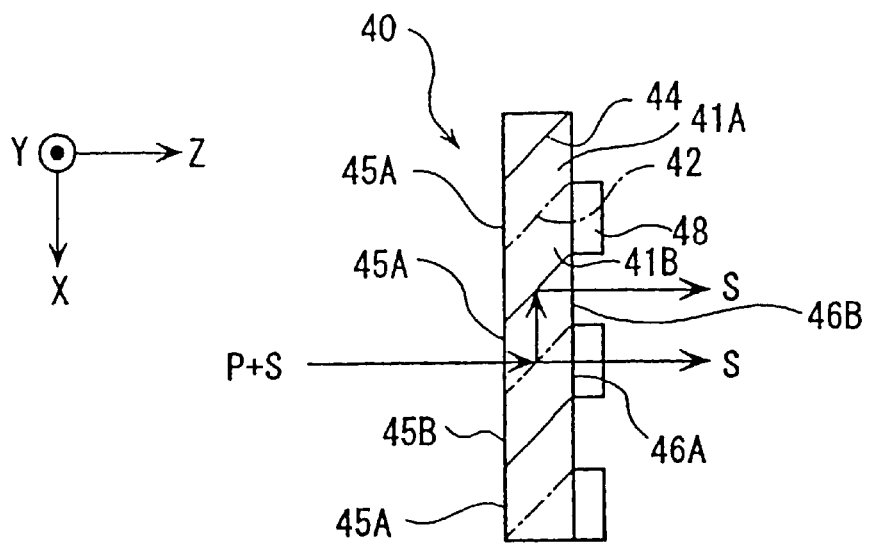
Figure 3B:
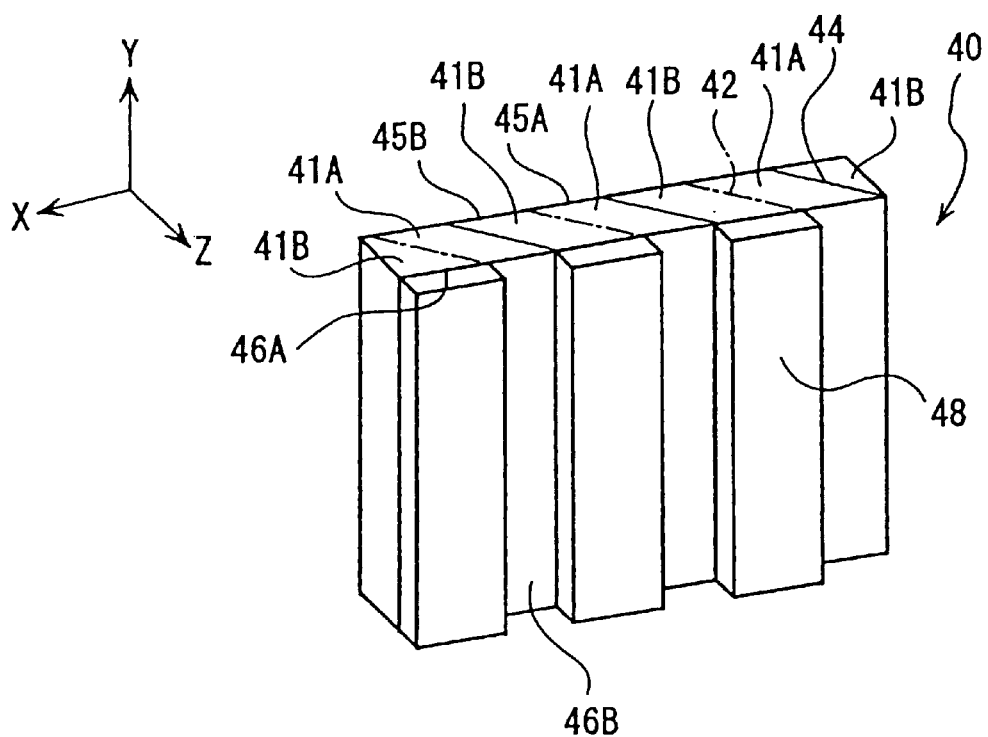

The retardation films 48 have the function of bringing a direction of polarization of one of the polarized light beams of the transmitted light and the reflected light into substantially coincidence with a direction of polarization of the other polarized light beam. In this embodiment, $\lambda/2$ phase plates are used as the retardation films 48, and are selectively disposed only on the emission surfaces 46A, as shown in FIGS. 3(a) and 3(b). Therefore, only the direction of polarization of light transmitted by the polarization beam separation films 42 is rotated by approximately 90 degrees, and most of light emitted from the polarization conversion element 40 is converted into one type of polarized light beam. In this embodiment, most of light emitted from the polarization conversion element 40 is converted into s-polarized light beam.

The type and the position of the retardation films are not limited as long as they can unify directions of polarization of two polarized light beams separated by the polarization beam separation films 42 into one direction of polarization of one type of polarized light beam. For example, a configuration may be such that retardation films having different optical characteristics are disposed on the emission surfaces 46A and the emission surfaces 46B so as to unify the directions of polarization of polarized light beams passing through the retardation films.

Since the polarization conversion element 40 as described above is used, unpolarized light emitted from the light source lamp 10 can be efficiently converted into one type of polarized light beam. Therefore, in the liquid crystal device 1000 which can utilize only one type of polarized light beam, it is possible to increase light utilization efficiency.

1-4 Relay Optical System

The relay optical system 30 is a transmission optical system for transmitting an image formed on the emission end surface 26 of the rod 20 to the liquid crystal device 1000 that is an area to be illuminated, as shown in FIG. 1. In this embodiment, the relay optical system 30 is composed of the condenser lens 31, the first transmission lens 50, the second transmission lens 52, and a collimator lens 32.

The condenser lens 31 is disposed in the vicinity of the emission end surface 26 of the rod 20, and has the function of guiding partial light beams from the rod 20 into the polarization conversion element 40 via the first transmission lens 50. While the condenser lens 31 of this embodiment is composed of a combined lens of two condenser lenses 31a and 31b, it is not limited thereto, and a general single lens may be used. However, in order to reduce optical aberration that tends to occur when guiding the partial light beams to the polarization conversion element 40, the combined lens or an aspherical lens is suitably used.

The first transmission lens 50 is a lens array in which a plurality of rectangular condenser lenses 51 are combined approximately in a matrix, and has the function of efficiently guiding each of the plurality of partial light beams into the surface of incidence 45A (see FIGS. 3(a)–(b)) of the polarization conversion element 40. The number and the disposition of the condenser lenses 51 are determined so as to correspond to the number and the position of light source images S formed by the partial light beams. While the shape of the condenser lenses 51 constituting the first transmission lens 50 is not restricted, a plurality of rectangular condenser lenses aligned two-dimensionally and formed in the shape of a plate as in this embodiment are easily utilized. In addition, if the first transmission lens 50 is configured by using the plurality of condenser lenses 51, light-collecting characteristics of the condenser lenses 51 can be optimized, so that optical aberration that tends to occur when transmitting light beams can be effectively reduced. However, the first transmission lens 50 may be configured by a single lens without using the plurality of condenser lenses according to the characteristic of the light beam emitted from the rod (for example, in the case of a small emission angle), and further, it is also possible to omit the first transmission lens.

The second transmission lens 52 is disposed on the emission side of the polarization conversion element 40, and has the function of transmitting a plurality of partial light beams emitted from the polarization conversion element 40 onto the liquid crystal device 1000 that is an area to be illuminated, and superimposing the partial light beams on one area to be illuminated. While the second transmission lens 52 of this embodiment is constituted by one lens, it may be a lens array configured by a plurality of lenses in a manner similar to the first transmission lens 50.

In this embodiment, while the first transmission lens 50 is disposed on the incident side of the polarization conversion element 40, and the second transmission lens 52 is disposed on the emission side of the polarization conversion element 40, these transmission lenses 50 and 52 may be disposed together on the incident side or the emission side of the polarization conversion element 40, and in this case, the functions of the transmission lenses 50 and 52 may be put together to form one lens. In this case, the cost of the illuminating device can be reduced. In addition, in this embodiment, since the first transmission lens 50 is disposed on the incident side of the polarization conversion element 40, the function of effectively guiding each of the plurality of partial light beams into the surface of incidence 45A of the polarization conversion element 40 is provided to the first transmission lens 50. In addition, since the second transmission lens 52 is disposed on the emission side of the polarization conversion element 40, the function of superimposing the plurality of partial light beams on the liquid crystal device 1000 is provided to the second transmission lens 52. The functions provided to the transmission lenses 50 and 52, however, may be appropriately changed according to the positions where the transmission lenses 50 and 52 are disposed.

The collimator lens 32 is disposed on the incident side of the liquid crystal device 1000 that is an area to be illuminated, and has the function of converting the plurality of partial light beams incident on the liquid crystal device 1000 from the polarization conversion element 40 via the second transmission lens 52 into light nearly parallel to each of central axes thereof, and effectively guiding the light into the liquid crystal device 1000. Therefore, the collimator lens 32 is not necessarily required, and it can be omitted.

Since the relay optical system 30 as described above is disposed, the image formed on the emission end surface 26 of the rod 20 is enlarged or reduced, and is transmitted onto the liquid crystal device 1000 that is an area to be illuminated.

2. Polarization Beam Splitter, Liquid Crystal Device, Projection Lens

The polarization beam splitter 60 is formed by sandwiching and joining the polarization selection surface 62 between two rectangular prisms, and is an optical element having the function of separating an unpolarized light beam into two types of linear polarized light beams whose directions of polarization nearly perpendicularly intersect. The polarization selection surface 62 is formed of a dielectric multilayer film in a manner similar to the polarization beam separation film 42 forming the polarization conversion element 40.

S-polarized light beam emitted from the illuminating device 1 enters the polarization beam splitter 60, is reflected by the polarization selection surface 62, and is emitted toward the reflective-type liquid crystal device 1000. The liquid crystal device 1000 modulates the light according to external image signals (not shown) to change a polarization state. While the reflective-type liquid crystal device 1000 is well known, detailed description of the structure and the operation thereof will be omitted.

Light modulated by the liquid crystal device 1000 enters the polarization beam splitter 60. The light modulated by the liquid crystal device 1000 is partially converted into the p-polarized state according to the image signals, and a light beam converted into the p-polarized state is transmitted by the polarization selection surface 62, and is emitted toward the projection lens 300. The light emitted toward the projection lens 300 is projected onto a projection plane 2000, such as a screen, via the projection lens 300.

Two polarizers 70 and 72 disposed on the incident side and the emission side of the polarization beam splitter 60 have the function of further increasing the degree of polarization of polarized light beams passing through these polarizers. When the degree of the polarized light beams emitted from the illuminating device 1 is sufficiently high, the polarizer 70 can be omitted. Similarly, when the degree of polarization of polarized light beams emitted from the polarization beam splitter 60 toward the projection lens 300 is sufficiently high, the polarizer 72 can be omitted.

In this embodiment, while the liquid crystal device 1000 is disposed at a position opposing the projection lens 300 across the polarization beam splitter 60, the liquid crystal device 1000 can be also disposed at a position opposing the illuminating device 1 across the polarization beam splitter 60. In this case, the configuration may be such that the polarization states of the illuminating light beams emitted from the illuminating device 1 may be unified in the p-polarized state in advance so that the s-polarized light beam emitted from the liquid crystal device 1000 enters a projection optical system. Alternatively, the polarization selection surface 62 of the polarization beam splitter 60 may have characteristics of reflecting the p-polarized light beam and transmitting the s-polarized light beam.

3. Relationship between Direction of Polarization Beam Separation and Polarization Selection Surface 62

Figure 4:
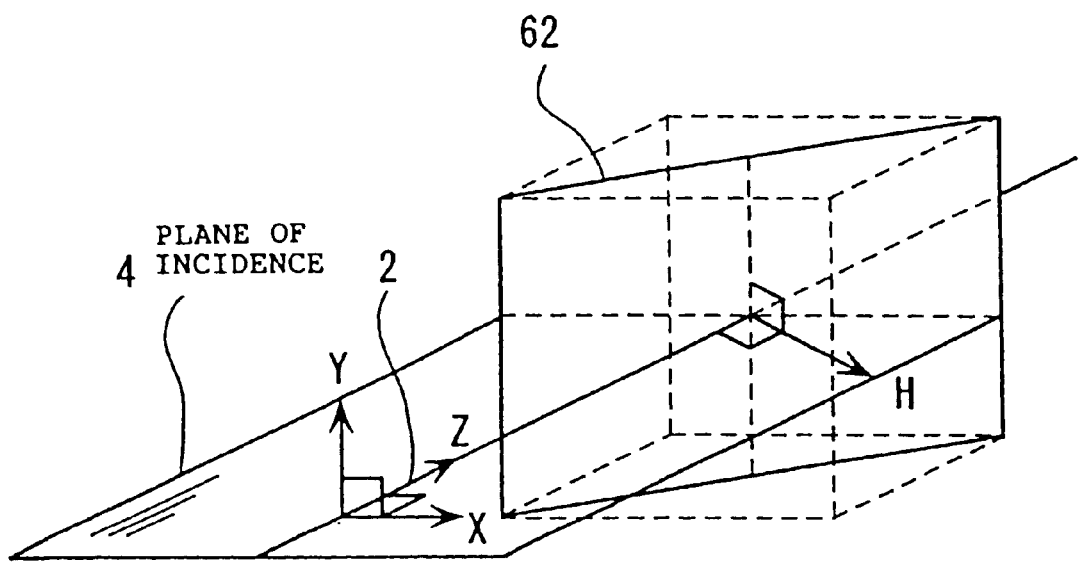
FIG. 4 is an illustration showing the geometric relationship between a polarization selection surface and a light beam incident thereon in the embodiment.

FIG. 4 shows the geometric positional relationship between the polarization selection surface 62 and a light beam incident thereon. In FIG. 4, a plane of incidence 4 is a virtual plane defined by a central axis 2 of an illuminating light beam incident on the polarization selection surface 62 and the normal line H of the polarization selection surface 62, and is parallel to the X-Z plane.

The polarization beam separability of the polarization selection surface 62 has strong incident-angle-dependency. That is, if the incident angle of light increases in the X-axis direction parallel to the plane of incidence 4 or in the Y-axis direction perpendicularly intersecting the plane of incidence 4, the polarization beam separability is reduced. As previously described, the polarization selection surface 62 reflects and emits the s-polarized light beam included in the illuminating light toward the liquid crystal device 1000, and selects and emits the p-polarized light beam in the light modulated by the liquid crystal device 1000 toward the projection lens 300. Therefore, when the polarization beam separability of the polarization selection surface 62 is reduced, the amount of s-polarized light beam guided to the liquid crystal device 1000 is decreased, so that light utilization efficiency is lowered and the projected image becomes dark. Moreover, since the function as a filter for selecting a specific polarized light beam in the light modulated by the liquid crystal device 1000 is reduced, the contrast ratio of the projected image is also lowered.

It is possible to sufficiently reduce the incident-angle-dependency in the X-axis direction parallel to the plane of incidence 4 by arranging the structure (for example, a type of a dielectric film or a way of configuration) of the polarization selection surface 62. On the other hand, the incident-angle-dependency in the Y-axis direction perpendicularly intersecting the plane of incidence 4 cannot be resolved by arranging the structure of the polarization selection surface 62 because it is dominated by the geometric positional relationship between the polarization selection surface 62 and the light incident thereon. Therefore, in order to maintain the polarization beam selectivity of the polarization selection surface 62 when light is entered the polarization selection surface 62 with an angle, it is particularly important to decrease the incident angle in the Y-axis direction perpendicularly intersecting the plane of incidence 4.

Thus, in this embodiment, as shown in FIG. 1 and FIG. 3(a), the direction of polarization beam separation by the polarization conversion element 40 is the X-axis direction parallel to the plane of incidence 4 to thereby prevent an increase in the incident angle in the Y-axis direction. That is, since the polarization beam separation is effected by the polarization conversion element 40 in the X-axis direction, the overall diameter of the illuminating light beam is enlarged in the X-axis direction, but the overall diameter of the illuminating light beam in the Y-axis direction perpendicularly intersecting the plane of incidence 4 is not enlarged. As a result, the increase in the incident angle in the Y-axis direction perpendicularly intersecting the plane of incidence 4 can be prevented, making it possible to maintain the polarization beam separability in a relatively high state. Therefore, a bright and high-contrast projected image can be realized.

B. Second Embodiment

The spacings of the light source images S formed on the virtual plane P can be arbitrarily controlled by adjusting the spacing of the reflecting surfaces of the rod. If the spacing of the reflecting surfaces is gradually narrowed from the incident end surface to the emission end surface, the spacings of the light source images S can be widened. Hereinafter, the state in which the spacing of the reflecting surfaces is gradually narrowed from the incident end surface toward the emission end surface is referred to as a "tapered state". Conversely, if the spacing of the reflecting surfaces is gradually widened from the incident end surface toward the emission end surface, the spacing of the light source images can be narrowed. Hereinafter, the state in which the spacing of the reflecting surfaces is gradually widened from the incident end surface toward the emission end surface is referred to as an "inversely tapered state".

This embodiment shows an exemplary embodiment in which the reflecting surfaces of the rod opposing in the Y-axis direction are in the inversely tapered state, and is the same as the projector of the first embodiment except the shape of the rod. Thus, description of portions except the rod will be omitted. In addition, it is possible to apply modified forms of the components described in the first embodiment to this embodiment.

Figure 5:
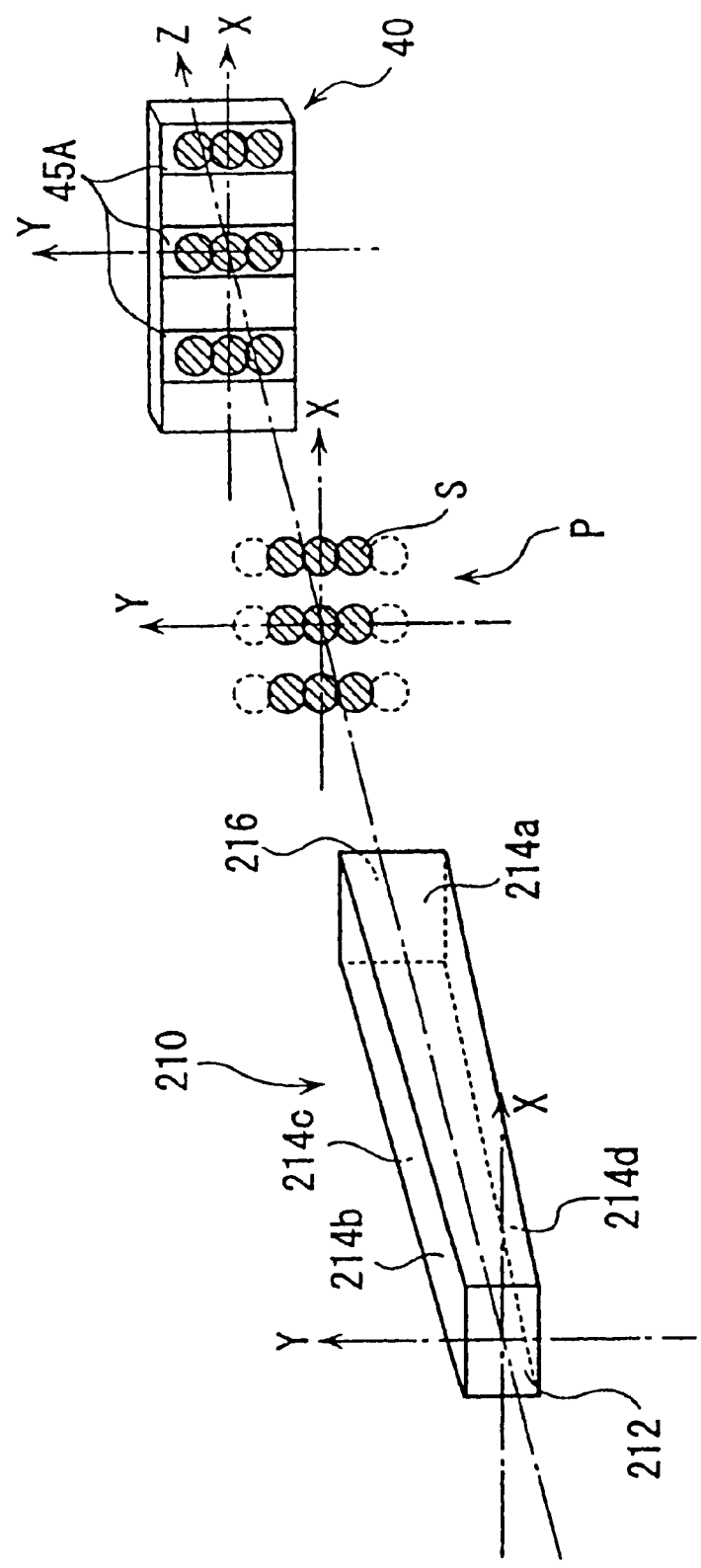
FIG. 5 is a schematic perspective view showing the relationship between a rod and positions of light source images S according to a second exemplary embodiment of the present invention.

FIG. 5 is a schematic perspective view showing the relationship between a rod 210 and positions of light source images S. The cross sections of both an incident end surface 212 and an emission end surface 216 on the X-Y plane have rectangular shapes. In the case of this embodiment, the emission end surface 216 is formed to have a shape substantially similar to the shape of a liquid crystal device that is an area to be illuminated. A pair of reflecting surfaces 214a and 214c opposing in the X-axis direction are parallel to each other. A pair of reflecting surfaces 214b and 214d opposing in the Y-axis direction are in the inversely tapered state. For this reason, as compared with the case of the rod 20 in the first embodiment, the placement spacings of the plurality of light source images S are narrowed in the Y-axis direction in which the pair of reflecting surfaces 214b and 214d in the inversely tapered state oppose.

Therefore, in this embodiment, the increase in the incident angle in the Y-axis direction perpendicularly intersecting the plane of incidence 4 of the polarization selection surface 62 can be further restrained, making it possible to maintain the polarization beam separability of the polarization selection surface 62 in a considerably high state.

Furthermore, in this embodiment, as a result of narrowing the placement spacings of the light source images S in the Y-axis direction, the size in the Y-axis direction of the polarization conversion element 40 and the polarization beam splitter can be reduced, whereby the size and cost of the illuminating device can be reduced and the size and cost of the projector can be reduced. Furthermore, the size of the projection lens 300 can be reduced, and a bright projected image can be realized even if a small-aperture lens is used.

C. Third Embodiment

A third exemplary embodiment of the present invention will now be described. This embodiment shows an embodiment in which reflecting surfaces of a rod opposing in the Y-axis direction are in the inversely tapered state in a manner similar to the second embodiment, and further, reflecting surfaces of the rod opposing in the X-axis direction are in the tapered state, and is the same as the projector of the first embodiment except the shape of the rod. Thus, description of portions except the rod will be omitted. In addition, it is also possible to apply modified forms of the components described in the first embodiment to this embodiment.

Figure 6:
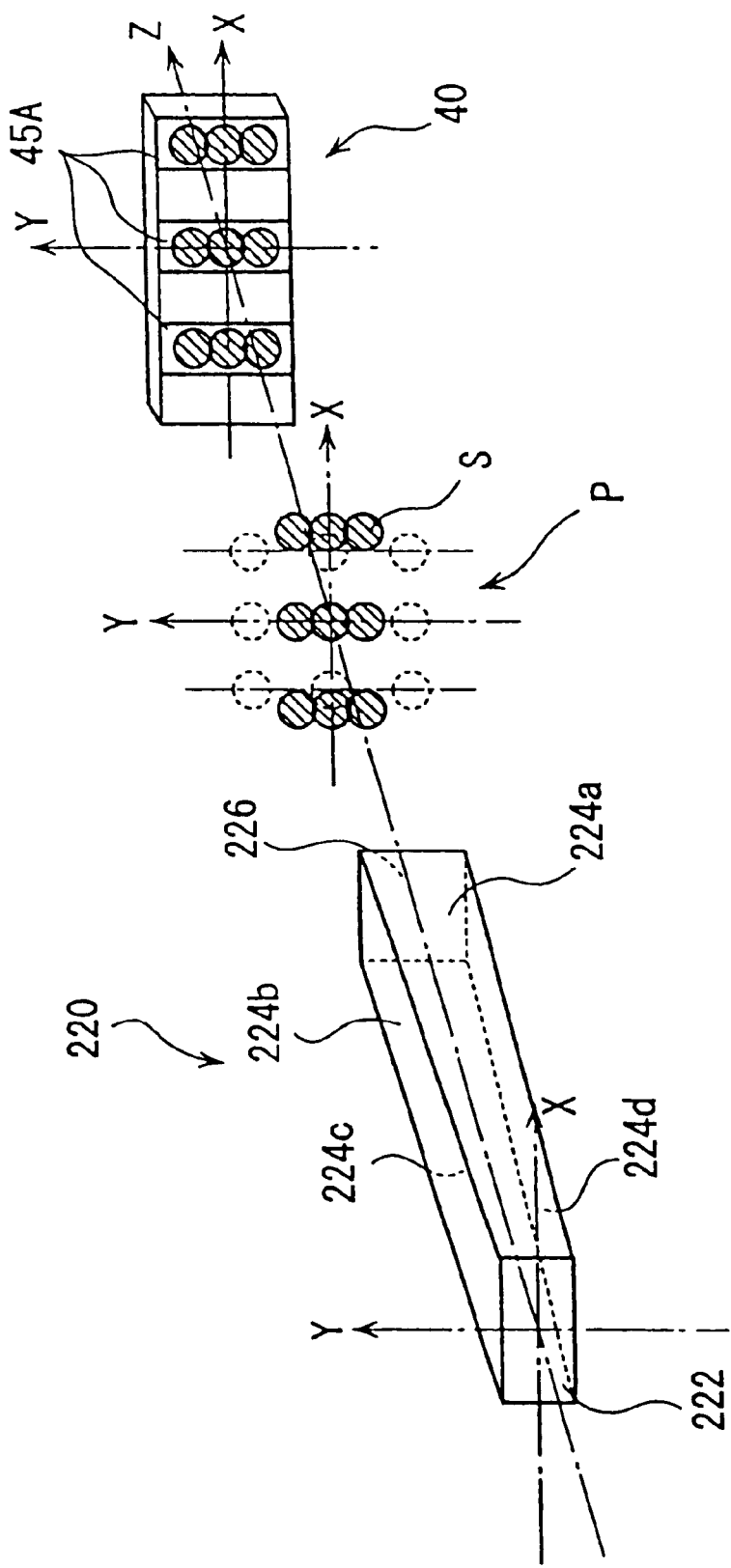
FIG. 6 is a schematic perspective view showing the relationship between a rod and positions of light source images S according to a third exemplary embodiment of the present invention.

FIG. 6 is a schematic perspective view showing the relationship between a rod 220 and positions of light source images S. The cross section of an emission end surface 226 of the rod 220 on the X-Y plane has a rectangular shape. In the case of this embodiment, the incident end surface 222 and the emission end surface 226 are formed to have a shape substantially similar to the shape of a liquid crystal device that is an area to be illuminated. A pair of reflecting surfaces 224b and 224d opposing in the Y-axis direction are in the inversely tapered state. For this reason, as compared with the case of the rod 20 in the first embodiment, the placement spacings of a plurality of light source images S are narrowed in the Y-axis direction in which the pair of reflecting surfaces 224b and 224d in the inversely tapered state oppose. Therefore, according to this embodiment, the same advantages as the second embodiment can be obtained.

Furthermore, in this embodiment, a pair of reflecting surfaces 224a and 224c opposing in the X-axis direction are in the tapered state. For this reason, as compared with the case of the rod 20 in the first embodiment, the placement spacings of the plurality of light source images S are widened in the X-axis direction in which the pair of reflecting surfaces 224a and 224c in the tapered state oppose.

The relationship between the polarization conversion efficiency of the polarization conversion element 40 and the position of incidence of light will be described with reference to FIGS. 3(a) and 3(b). As described in the first embodiment, the polarization conversion element 40 separates light illuminated on the surface of incidence 45A and incident on the polarization beam separation films 42 into p-polarized light beam and s-polarized light beam, reflects the s-polarized light beam by the reflecting films 44 in the same direction as the p-polarized light beam, converts the p-polarized light beam into s-polarized light beam by the retardation films 48, and finally emits the s-polarized light beam. If light is illuminated on the surface of incidence 45B of the polarization conversion element 40, however, the light enters the polarization beam separation films 42 via the reflecting films 44. Therefore, the first polarized light beam is transmitted by the polarization beam separation films 42 in the X-axis direction, and the second polarized light beam is reflected by the polarization beam separation films 42 in the Z-axis direction. As a result, polarized light beam different from that directly incident on the polarization beam separation films 42 via the surface of incidence 45A is emitted from the emission surfaces 46A and 46B. That is, although unpolarized light beam is to be converted into the second polarized light beam, the first polarized light beam is emitted by the polarization conversion element 40, whereby the polarization conversion efficiency is lowered. This reveals that, in order to obtain high polarization conversion efficiency of the polarization conversion element 40, it is very important to selectively allow a light beam to only enter the surface of incidence 45A. That is, it is preferable that the spacings between the polarization beam separation films 42 and the reflecting films 44 are set so that the size of the surface of incidence 45B is larger than the sizes of the light source images S.

In this embodiment, the spacings of the light source images S in the X-axis direction are widened so that the size of the surface of incidence 45A can be sufficiently larger than the sizes of the light source images S. Therefore, the light beam from the rod 220 can enter only the portion of the surface of incidence 45A of the polarization beam separation films 42 with a sufficient allowance, and the incident efficiency of light on the polarization beam separation film 42 can be securely increased. As a result, it becomes possible to increase light utilization efficiency in the projector while securely increasing the polarization conversion efficiency of the polarization conversion element 40.

When the light source lamp 10 is close to a point light source, the sizes of the light source images S can be made relatively small. Therefore, in this case, it is not necessary to widen the placement spacings of the light source images S in the X-axis direction. That is, this embodiment is very effective for a case where the light source 11 is not very close to the point light source, and the sizes of the light source images S increase.

D. Fourth Embodiment

Figure 7:
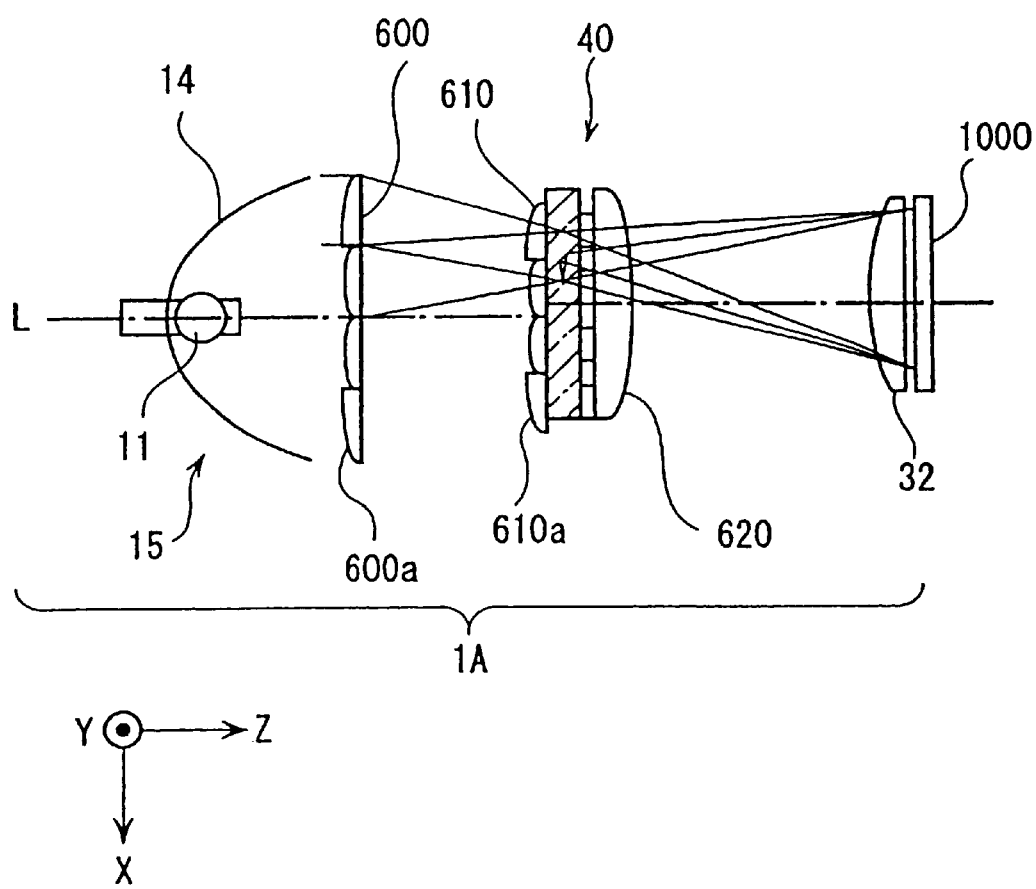
FIG. 7 is a schematic horizontal sectional view showing a fourth exemplary embodiment of the projector of the present invention.

FIG. 7 is a horizontal sectional view showing the schematic configuration of a fourth exemplary embodiment of the present invention. The fourth embodiment partially differs from the first embodiment in the configuration of the illuminating device. Other configurations are the same as the previously described first embodiment. Thus, description of the same configurations as the first embodiment will be omitted. In addition, it is also possible to apply modified forms of the components described in the first embodiment to this embodiment. In FIG. 7, the polarization beam splitter 60, the polarizers 70 and 72, the projection lens 300, and the projection plane 2000 are omitted.

An illuminating device 1A may include a light source lamp 15, a lens array 600, a first transmission lens 610, a polarization conversion element 40, a second transmission lens 620, and a collimator lens 32. This embodiment is characterized in that the lens array 600 consisting of a plurality of condenser lenses is used as a light beam dividing optical element instead of the rod. The illuminating device 1A divides light emitted from the light source lamp 15 into a plurality of partial light beams by the lens array 600, converts the partial light beams into one type of polarized light beam by the polarization conversion element 40, and then superimposes the polarized light beam on a display area of a liquid crystal device 1000 that is an area to be illuminated.

The light source lamp 15 may include a light source 11 for emitting light, and a parabolic reflector 14 for collecting light emitted from the light source 11. The reflector is not limited to the parabolic reflector, and it is possible to use an elliptical reflector or a spherical reflector according to the configurations of the lens array 600, the transmission lenses 610 and 620, the polarization conversion element 40, and the like disposed on the downstream of light source lamp 15.

The lens array 600 has a plurality of condenser lenses 600*a* arranged substantially in a matrix. The external shape of each of the condenser lens 600*a* is set so as to be similar to the shape of the display area of the liquid crystal device 1000 that is the area to be illuminated. Light incident on the lens array 600 from the light source lamp 15 is divided into a plurality of partial light beams by the light collecting action of each condenser lens 600*a* to form as many light source images as the number of the condenser lenses 600*a* in the X-Y plane, which is substantially perpendicular to the illumination optical axis L, substantially in a matrix. The condenser lenses 600*a* are set to have light collecting characteristics such that a plurality of light source images are formed only on the surface of incidence 45A (see FIGS. 3(*a*)–(*b*)) of the polarization conversion element 40. In this embodiment, by partially adopting a decentered lens in a part of the plurality of condenser lenses 600*a*, the spacings of the light source images to be formed are controlled.

Furthermore, the first transmission lens 610 disposed on the incident side of the polarization conversion element 40 has approximately the same function as the first transmission lens 50 in the first embodiment. The first transmission lens 610 has as many condenser lenses 610*a* as the number of the condenser lenses 600*a* constituting the lens array 600. In this embodiment, a part of the condenser lenses 610*a* is constituted by a decentered lens. The configuration is such that the condenser lenses 610*a* are positioned so as to correspond to positions where a plurality of light source images are formed. The light collecting characteristic of the condenser lenses 610 is set so that the partial light beams divided by the lens array 600 enter nearly perpendicularly the surface of incidence 45A of the polarization conversion element 40 (see FIGS. 3(*a*)–(*b*)). Therefore, since light can enter the surface of incidence 45A of the polarization conversion element 40 at an incident angle near 0 degree, it is possible to increase the polarization conversion efficiency. While the shape of each condenser lens 610*a* is not restricted, a rectangular or hexagonal shape is convenient because it is easily arrayed.

The second transmission lens 620 has the same function as the second transmission lens 52 in the first embodiment, that is, the function of superimposing the partial light beams divided by the lens array 600 on the display area of the liquid crystal device 1000 that is an area to be illuminated. While the second transmission lens 620 is formed of one axisymmetric spherical lens in this embodiment, it is not limited thereto. For example, a lens array, a Fresnel lens, a combined lens consisting of a plurality of lenses or the like, can be also adopted. When such a lens is used, various types of optical aberrations can be reduced. The use of the Fresnel lens is favorable for reducing the weight of the illuminating device 1A because the central thickness of the lens can be reduced.

In this embodiment, it is also possible to obtain the same advantages as the first embodiment.

While the decentered lens is partially used in the condenser lenses 600*a* and 610*a* constituting the lens array 600 and the first transmission lens 610 in this embodiment, the decentered lens does not have to be used. In addition, all of the condenser lenses 600*a* and 610*a* may be the decentered lenses. In this embodiment, it is possible to set the light collecting characteristics of the condenser lenses 600*a* of the lens array 600 such that the placement spacings of the light source images in the Y-axis direction are narrowed. Furthermore, it is also possible to set the light collecting characteristics such that the placement spacings in the X-axis direction are widened. By setting the light collecting characteristics of the condenser lenses 600*a* in this way, it is possible to obtain the same advantages as the second embodiment and the third embodiment.

E. Fifth Embodiment

Figure 8:
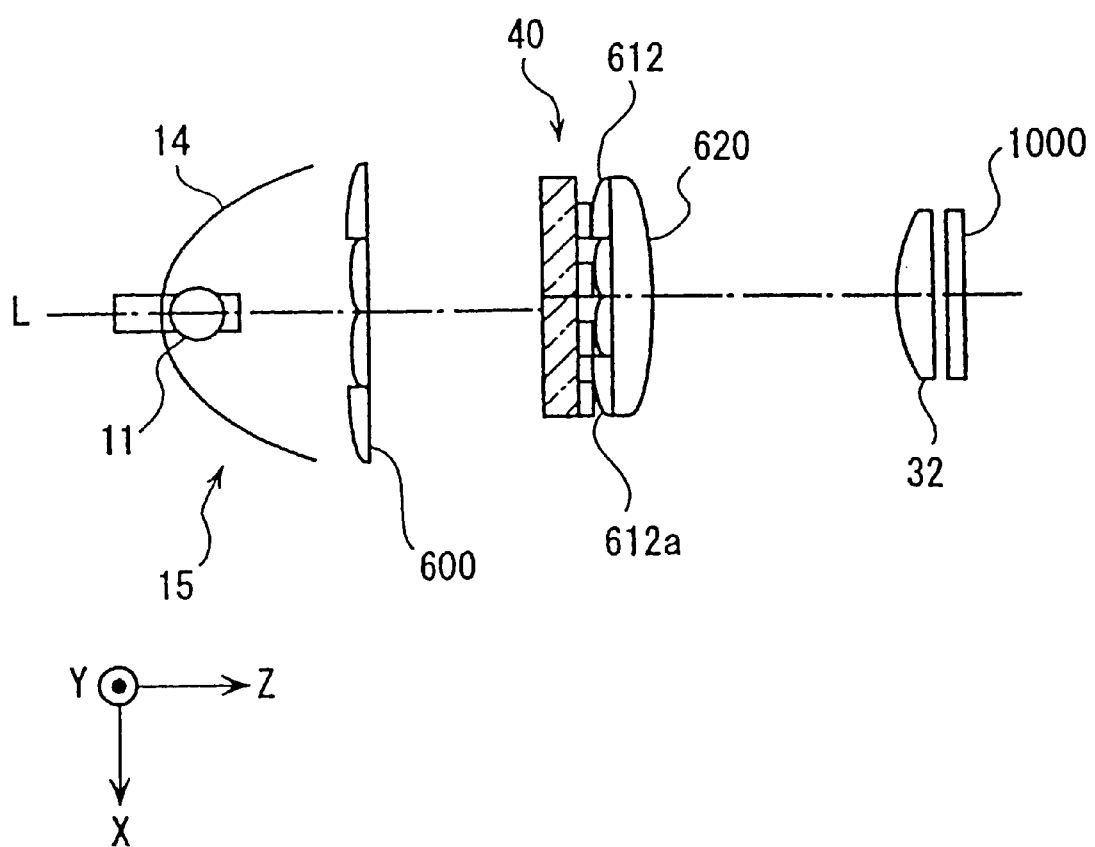
FIG. 8 is a schematic horizontal sectional view showing a fifth exemplary embodiment of the projector of the present invention.

FIG. 8 is a horizontal sectional view showing the schematic configuration of a fifth exemplary embodiment. The fifth embodiment is a modification of the above-described fourth embodiment, and differs from the fourth embodiment in that a first transmission lens 612 is disposed between the polarization conversion element 40 and the second transmission lens 620. Other points are the same as the fourth embodiment. Thus, description of the same configuration as the fourth embodiment will be omitted. In addition, it also possible to apply modified forms of the components described in the fourth embodiment to this embodiment. In FIG. 8, the polarization beam splitter 60, the polarizers 70 and 72, the projection lens 300, and the projection plane 2000 are omitted.

The first transmission lens 612 is, as is the first transmission lens 610 in the fourth embodiment, a lens array composed of a plurality of condenser lenses 612*a*. While the first transmission lens 610 in the fourth embodiment has the function of allowing the partial light beams to nearly perpendicularly enter the surface of incidence 45A of the polarization conversion element 40, the first transmission lens 612 of this embodiment does not have such a function because it is disposed on the emission side of the polarization conversion element 40. The configuration of this embodiment practically omits the first transmission lens 610 of the fourth embodiment. Therefore, the configuration is easily adopted when characteristics of light emitted from the light source lamp 15, for example, parallelism is excellent.

The basic action and effect of this embodiment are the same as the action and effect of the fourth embodiment. According to this embodiment, however, since the number of interfaces can be decreased by optically combining the first transmission lens 612 and the second transmission lens 620, optical loss can be decreased. In addition, since the first transmission lens 612 is also provided with the function of the second transmission lens 620, it is possible to omit the second transmission lens 620, and to reduce the cost of the illuminating device and the projector.

While one condenser lens 612a corresponds to the emission surface 46A and the emission surface 46B (see FIGS. 3(a)–(b)) of the polarization conversion element 40 in this embodiment, if the condenser lenses 612a are disposed so as to provide one-to-one correspondence to the emission surface 46A and the emission surface 46B of the polarization conversion element 40, that is, if the first transmission lens 612 is formed using double the number of the condenser lenses 612a in FIG. 8, it is possible to further increase the light utilization efficiency of the first transmission lens 612.

F. Sixth Embodiment

Figure 9A:
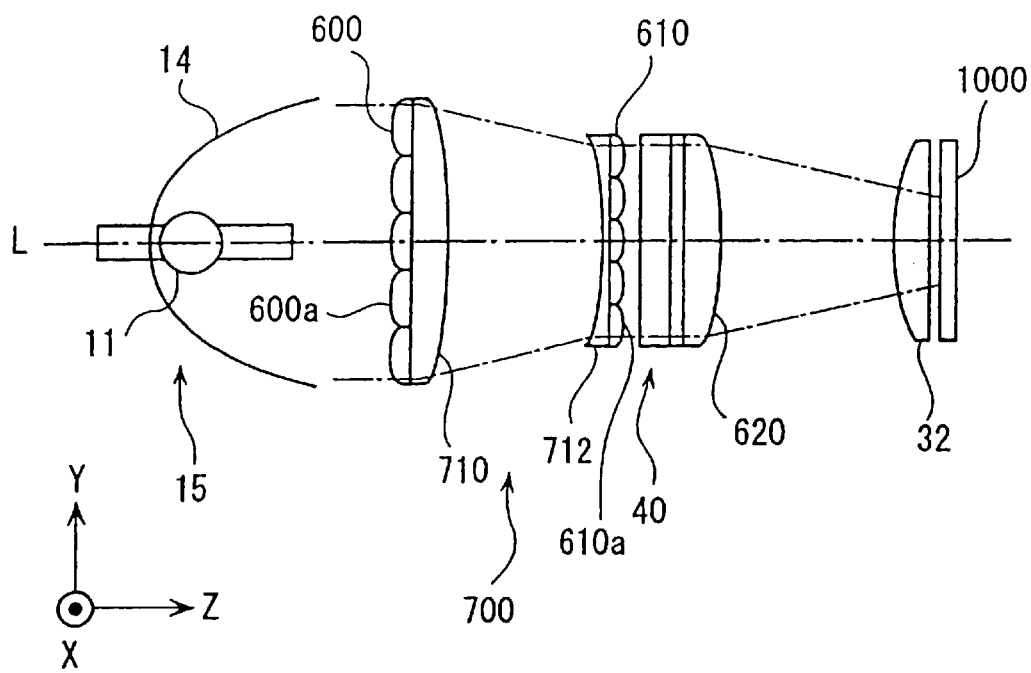
Figure 9B:
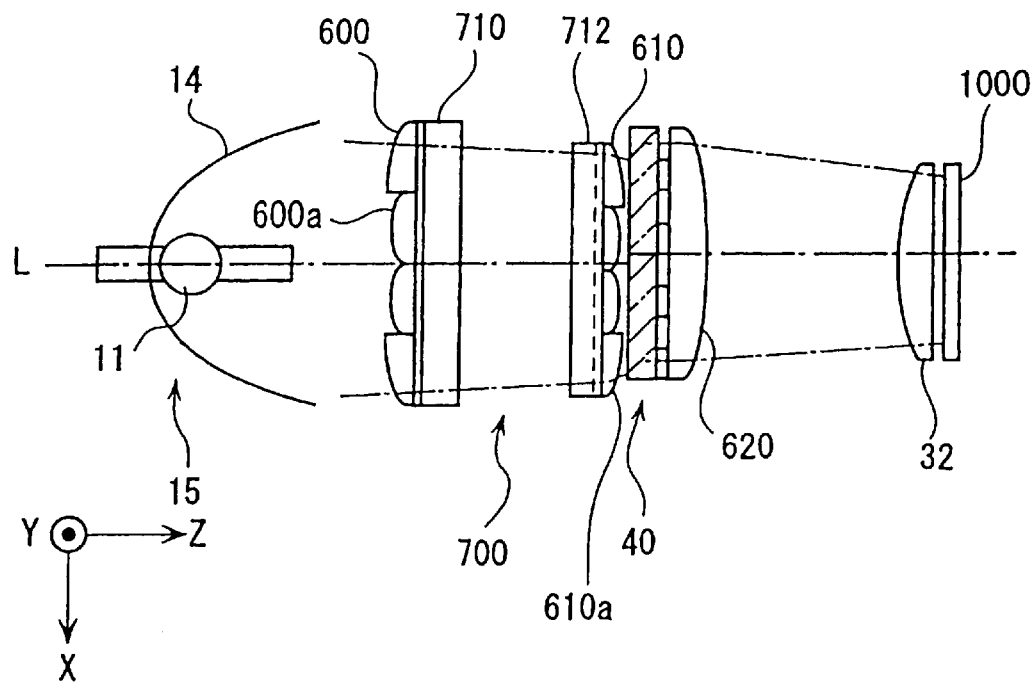

FIGS. 9(a)–(b) show the schematic configuration of a sixth exemplary embodiment of the projector of the present invention in which FIG. 9(a) is a vertical sectional view as seen from the X-axis direction, and FIG. 9(b) is a horizontal sectional view as seen from the Y-axis direction.

The sixth embodiment is a modification of the previously described fourth embodiment, and is characterized in that an afocal optical system 700 serving as a reducing optical system is disposed between the lens array 600 and the first transmission lens 610. Other points are the same as the fourth embodiment. Thus, description of the same configuration as the fourth embodiment will be omitted. It is also possible to apply modified forms of the components described in the fourth embodiment to this embodiment. In FIGS. 9(a) and 9(b), the polarization beam splitter 60, the polarizers 70 and 72, the projection lens 300, and the projection plane 2000 are omitted.

The afocal optical system 700 has the function of reducing a diameter of overall light beams without much deteriorating parallelism of light passing therethrough. In this embodiment, the afocal optical system 700 is constituted by a cylindrical convex lens 710 and a cylindrical concave lens 712 each having a curvature only in the Y-axis direction. The function equivalent to that of the cylindrical lenses 710 and 712 can be also realized by a combined lens consisting of two or more lenses. In this case, the optical aberration can be reduced. The cylindrical convex lens 710 is set on the emission side of the lens array 600, and refracts light passing through the cylindrical convex lens 710 only in the Y-axis direction to turn the light toward the illumination optical axis L. On the other hand, the cylindrical concave lens 712 is set on the incident side of the first transmission lens 610, and substantially collimates the turned light from the cylindrical convex lens 710 with respect to the illumination optical axis L. In this embodiment, since the afocal optical system 700 constituted by the cylindrical lenses 710 and 712 each having the curvature only in the Y-axis direction is used in this way, the spread of a light beam in the Y-axis direction can be further restrained, making it possible to maintain the polarization beam separability of the polarization selection surface in a considerably high state. Therefore, it is possible to realize a very bright and high-contrast projected image. Furthermore, in this embodiment, as a result of restraint of the light beam in the Y-axis direction, the sizes of the polarization conversion element 40 and the polarization beam splitter 60 in the Y-axis direction can be reduced, whereby a reduction in size and cost of the illuminating device, and a reduction in size and cost of the projector can be achieved.

In addition, the size of the projection lens 300 can be also reduced, and a bright projected image can be realized even if a small-aperture lens is used.

Furthermore, in the case of this embodiment, it is possible to easily maintain the polarization beam separability in a high state without setting the light collecting characteristics of condenser lenses 600a of the lens array 600 in the Y-axis direction in a complicated manner.

While the cylindrical lenses 710 and 712 each having the curvature only in the Y-axis direction are used in this embodiment, a lens having the curvature in two directions, or a toric lens may be used. This makes it possible to restrain the spread of the overall light beams in the X-axis direction, and the polarization beam separability of the polarization selection surface 62 can be maintained in a higher state.

G. Illuminating Device according to Seventh Embodiment

Figure 10:
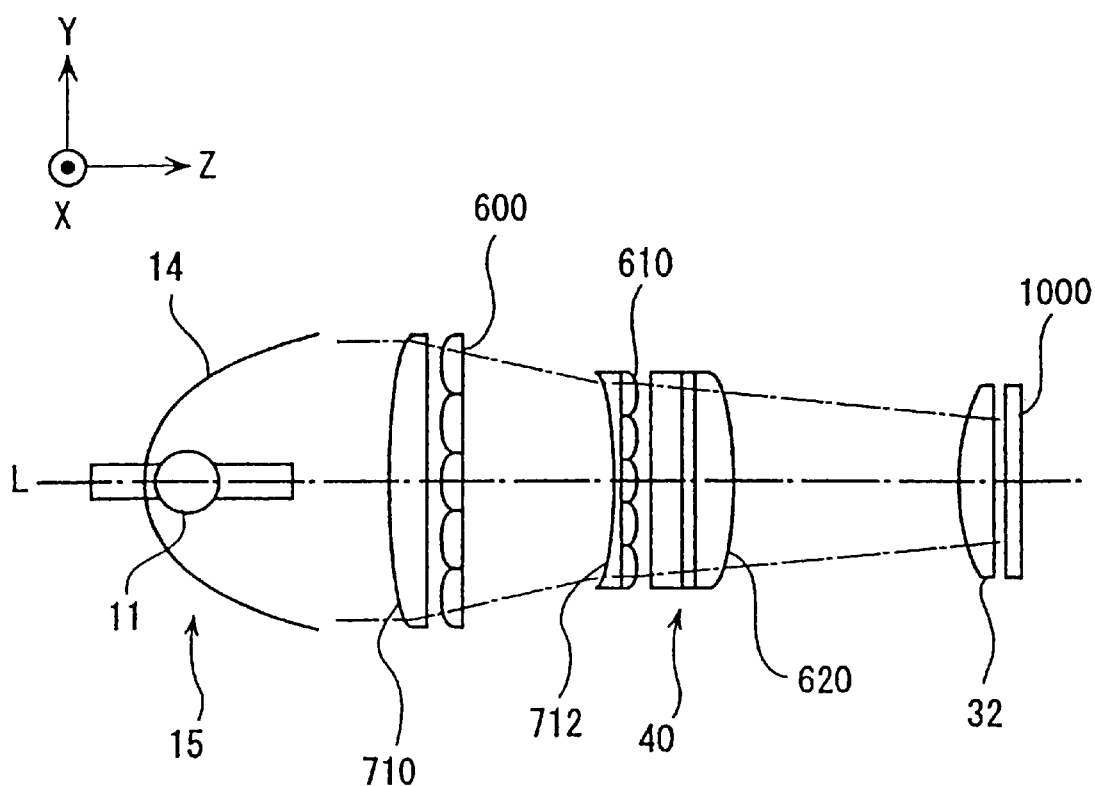
FIG. 10 is a vertical sectional view showing the schematic configuration of a seventh exemplary embodiment of the projector of the present invention.

FIG. 10 is a vertical sectional view showing the schematic configuration of a seventh exemplary embodiment of the projector of the present invention. The seventh embodiment is a modification of the above-described sixth embodiment, and is characterized in that a cylindrical convex lens 710 constituting an afocal optical system 700 serving as a reducing optical system is placed on the incident side of a lens array 600 serving as a light beam dividing optical element. Since other configurations are the same as the sixth embodiment, description thereof will be omitted. In addition, it is possible to apply modified forms of the components described in the sixth embodiment to this embodiment. In FIG. 10, the polarization beam splitter 60, the polarizers 70 and 72, the projection lens 300, and the projection plane 2000 are omitted.

Even if the position of the cylindrical convex lens 710 is changed as in this embodiment, it is possible to achieve the same action and effect as the sixth embodiment.

A configuration may be such that a cylindrical concave lens 712 is disposed on the emission side of a first transmission lens 610.

H. Eighth Embodiment

Figure 11A:
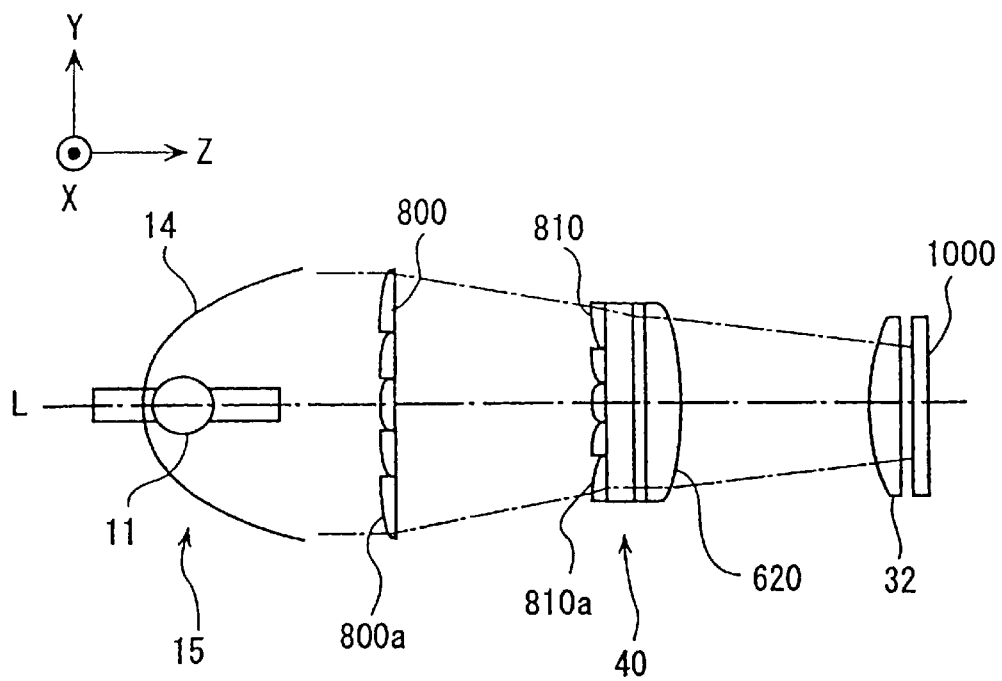
Figure 11B:
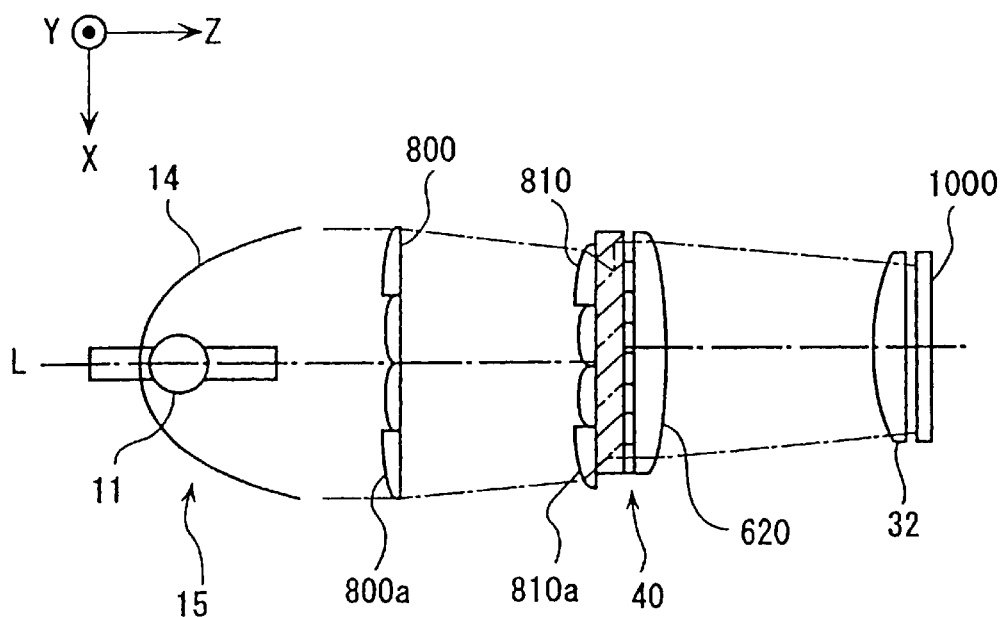

FIGS. 11(a)–(b) include diagrams each showing the schematic configuration of an eighth exemplary embodiment of the projector of the present invention, in which FIG. 11(a) is a vertical sectional view as seen from the X-axis direction, and FIG. 11(b) is a horizontal vertical view as seen from the Y-axis direction. The eighth embodiment is a modification of the previously described sixth and seventh embodiments, and is characterized in that the function of the afocal optical system is provided to the lens array 600 and the first transmission lens 610 in the sixth and seventh embodiments. That is, a lens array 800 serving as a light beam dividing optical element and a first transmission lens 810 realize the afocal optical system serving as a reducing optical system. In addition, it is possible to apply modified forms of the components described in the sixth and seventh embodiment to this embodiment. In FIGS. 11(a) and 11(b), the polarization beam splitter 60, the polarizers 70 and 72, the projection lens 300, and the projection plane 2000 are omitted.

The lens array 800 is constituted by a plurality of condenser lenses 800a arranged in a matrix. Light emitted from a light source lamp 15 is divided into a plurality of partial light beams by the light collecting action of the condenser lenses 800a to form as many light source images as the number of the condenser lenses 800a in the X-Y plane nearly perpendicularly intersecting an illumination optical axis L. In addition, the lens array 800, as is the cylindrical convex lens 710 in the sixth and seventh embodiments, has the function of refracting light in the Y-axis direction to turn the light toward the illumination optical axis L.

The first transmission lens 810 is constituted by a plurality of condenser lenses 810a arranged in a matrix. The configuration is such that the positions of the condenser lenses 810a correspond to positions where a plurality of light source images are formed. The light collecting characteristics of the condenser lenses 810a are set so that the partial light beams passing through the condenser lenses 810a nearly perpendicularly enter the surface of incidence 45A of the polarization conversion element 40. In addition, the fist transmission lens 810, as is the cylindrical concave lens 712 in the sixth and seventh embodiments, has the function of substantially collimating light with respect to the illumination optical axis L.

By this embodiment, it is also possible to achieve the same action and effect as the above-described sixth and seventh embodiments. Furthermore, since the same function as the afocal optical system 700 of the sixth and seventh embodiments can be realized by the lens array 800 serving as the light beam dividing optical element and the first transmission lens 810, it is possible to realize reductions in size, weight, and cost of the illuminating device by reducing the number of members.

I. Illuminating Device according to Ninth Embodiment

Figure 12:
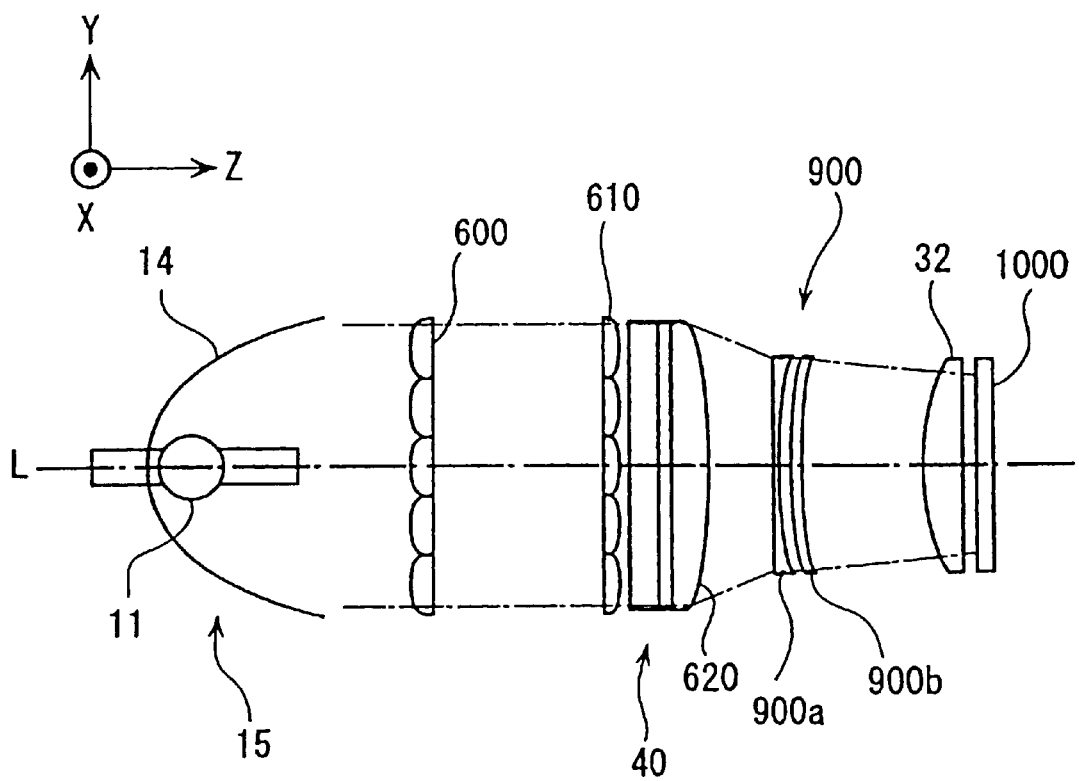
FIG. 12 is a vertical sectional view showing the schematic configuration of a ninth exemplary embodiment of the projector of the present invention.

FIG. 12 is a vertical sectional view showing the schematic configuration of a ninth exemplary embodiment of the projector of the present invention.

The ninth embodiment is a modification of the previously described fourth embodiment, and is characterized in that a concave lens system 900 serving as a reducing optical system is placed between a second transmission lens 620 and a collimator lens 32. Other points are the same as the fourth embodiment. Thus, description of the same configurations as the fourth embodiment will be omitted. In addition, it is also possible to apply modified forms of the components described in the fourth embodiment to this embodiment. In FIG. 12, a polarization beam splitter 60, the polarizers 70 and 72, the projection lens 300, and the projection plane 2000 are omitted.

The concave lens system 900 is composed of a combined lens formed by a combination of two concave lenses 900a and 900b in order to reduce the optical aberration, and has an action of compressing a diameter of the overall light beams in the X-direction and the Y-axis direction. Therefore, the spread of the light beam in the Y-axis direction and the X-axis direction can be further restrained, making it possible to maintain the polarization beam separability in a considerably high state. Thus, a very bright and high-contrast projected image can be realized. Furthermore, in this embodiment, as a result of restraint of the light beam in the Y-axis direction and the X-axis direction, the sizes of the polarization conversion element 40 and the polarization beam splitter 60 can be reduced, and a reduction in size and cost of the illuminating device, and a reduction in size and cost of the projector can be achieved. In addition, the size of the projection lens 300 can be reduced, and a bright projected image can be realized even if a small-aperture lens is used.

A configuration may be such that the concave lens system 900 is a cylindrical concave lens having the curvature only in the Y-axis direction to restrain the spread of light in the Y-axis direction. In addition, the concave lens system 900 may be used in the projector using the rod as in the first to third embodiments.

J. Tenth Embodiment

Figure 13:
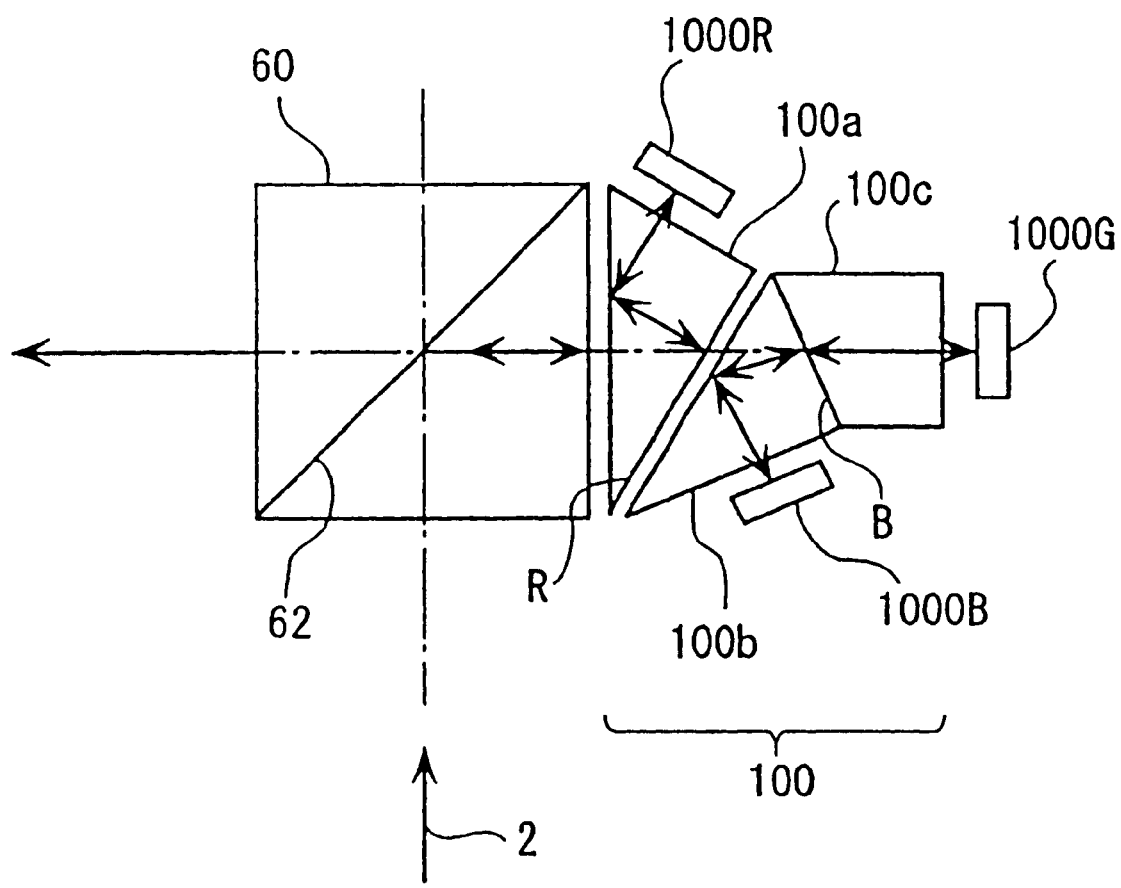
FIG. 13 is a schematic horizontal sectional view showing a tenth exemplary embodiment of the projector of the present invention.

FIG. 13 is a schematic horizontal sectional view showing a principal part of the projector according to a tenth exemplary embodiment of the present invention. This embodiment is a modification of the projector according to the above first to ninth embodiments, and is characterized in that light emitted from a polarization beam splitter 60 is separated into red light, blue light and green light using a wedge-shaped prism serving as a spectral device, and colored lights enter into three reflective-type liquid crystal devices provided in correspondence with the colored light to realize a color image. The configuration part shown in FIG. 13 is a part that can be replaced by the configurations subsequent to the collimator lens 32 of the first to ninth embodiments. Both illustration and description of a portion toward the light source from the collimator lens 32, the projection lens 300, and the projection plane 2000 will be omitted.

The color separating device 100 is formed by a combination of three prisms 100a, 100b, and 100c. The wedge-shaped prism 100a is formed in the columnar shape having a triangular cross section, and a dichroic film R for reflecting the red light and transmitting other colored lights is formed on a surface thereof adjacent to the wedge-shaped prism 100b. The wedge-shaped prism 100a is disposed between the polarization beam splitter 60 and the wedge-shaped prism 100b so as to have very small clearances. The wedge-shaped prism 100b has the shape similar to the wedge-shaped prism 100a, and a dichroic film B for reflecting blue light and transmitting other colored lights is formed on the surface thereof bonded to the wedge-shaped prism 100c. The prism 100c is a columnar prism having a substantially trapezoidal cross section in which each one side is formed as an oblique line. A plane equivalent to the oblique line of the prism 100c is bonded to the plane of the wedge-like prism 100b on which the dichroic film B for blue light is formed.

A liquid crystal device 1000R is a reflective-type liquid crystal device specially designed for the red light, and is set to face a plane on which the dichroic film R for the red light of the wedge-shaped prism 100a is not formed, and which is not adjacent to the polarization beam splitter 60. In addition, a liquid crystal device 1000B is a reflective-type liquid crystal device specially designed for the blue light, and is set to face a plane on which the dichroic film B for the blue light of the wedge-shaped prism 100b is not formed and which is not adjacent to the wedge-shaped prism 100a. Furthermore, a liquid crystal device 1000G is a reflective-type liquid crystal device specially designed for the green light, and is set to face a plane equivalent to an opposite side of the oblique line of the prism 100c. The basic structures of the liquid crystal devices 1000R, 1000B, and 1000G are the same as the liquid crystal device 1000 used in the above embodiments, and optical characteristics of liquid crystal layers and pixel electrodes are optimized according to the wavelength region of the corresponding colored light.

In this embodiment, a polarized light beam (for example, s-polarized light beam) emitted from the illuminating device and reflected by a polarization selection surface 62 of the polarization beam splitter 60 firstly enter the wedge-shaped prism 100a to be -separated into a red light to be reflected by the dichroic film R for the red light, and a blue light and a green light to be transmitted by the dichroic film R for the red light. The red light reflected by the dichroic film R for the red light is totally reflected at an interface of the wedge-shaped prism 100a facing the polarization beam splitter 60 and then, enters the liquid crystal device 1000R for the red light, and is modulated based on external image information (not shown). Next, the blue light and the green light transmitted by the dichroic film R for the red light enter the wedge-shaped prism 100b to be separated into a blue light reflected by the dichroic film B for the blue light and a green light transmitted by the dichroic film G for the blue light. The blue light reflected by the dichroic film B for the blue light is totally reflected at an interface of the wedge-shaped prism 100b facing the wedge-shaped prism 100a and then, enters the liquid crystal device 1000B specially designed for the blue light, and is modulated based on external image information (not shown). Finally, the green light transmitted by the dichroic film B for the blue light goes substantially straight in the prism 100c to enter the liquid crystal device 1000G specially designed for the green light, and is modulated based on external image information (not shown).

Each of the colored lights reflected by each of the liquid crystal devices 1000R, 1000B, and 1000G, returns through the same optical path at the time of entering to be synthesized as a projected light, and enters the polarized beam splitter 60 again. Since the polarized light beams modulated by the external image information are partially p-polarized light beams, the polarized light beams are transmitted by the polarization selection surface 62, and are enlarged and projected on a front projection plane 2000 by a projection lens 300 serving as a projection means. Three colored lights modulated by the three liquid crystal devices 1000R, 1000G, and 1000B are projected onto the projection plane 2000 by the above process so as to be superimposed at the same position, and display a color image. A configuration may be adopted in which the color separating device 100 is disposed at a position to oppose the illuminating device across the polarization beam splitter 60. In this case, the polarization state of illumination light emitted from the illuminating device is unified in the p-polarized state so that s-polarized light beams emitted from the reflective-type liquid crystal devices 1000R, 1000R, 1000G, and 1000B enter the projection lens 300.

In this embodiment, the sizes of the polarization beam splitter 60 and the like are relatively large, compared with the sizes of the liquid crystal devices 1000R, 1000G, and 1000B, as shown in FIG. 13. For this reason, in particular, the combination of this embodiment with the fifth to eighth embodiments in which the afocal optical system 700 serving as a reducing optical system and the concave lens system 900 are adopted is convenient for realizing a reduction in size of the polarization beam splitter 60.

According to this embodiment, it is possible to obtain the same advantage as one of the first to ninth embodiments.

K. Other Embodiments

The embodiments of the present invention is not limited to the above-described examples, and various modifications can be made within the scope of the invention. For example, while the rods 20, 210, and 220 are composed of solid rods consisting of light-guiding materials in the above first to third embodiments, the rod may be cylindrical hollow rod formed by a member having a light-reflecting surface, for example, a reflecting mirror (surface-reflecting mirror is desirable). In this case, light is reflected by a reflection surface directed to the inside of the hollow rod, and the light propagates in air having a low refractive index as compared with a glass material or the like. A surface of a common reflecting mirror or the reflecting mirror on which a reflection-enhancing film is formed by a dielectric body can be used for the reflection surface. Since the hollow rod can be manufactured easier than the solid rod consisting of a mass of the light-guiding materials, it is possible to reduce the cost of the illuminating device to be lower than the case where the solid rod is used. Furthermore, since air having a refractive index almost equal to 1 is contained in the hollow rod, the sizes of the rods 20, 210, and 220 in the Z-axis direction can be made shorter than the case where the solid rod having a refractive index larger than 1, and there is a possibility of reducing the size of the illuminating device, and the size of the projector.

In addition, the projector may be either of a rear-type in which a screen is projected from rearward, or a front-type in which the screen is projected from the front.

What is claimed is:

1. A projector, comprising:

a light beam dividing optical element that divides light from a light source into a plurality of partial light beams;

a polarization conversion element that converts the plurality of partial light beams into one type of polarized light beam polarized substantially in same directions;

an electro-optical device that modulates an illumination light beam emitted from the polarization conversion element;

a projection lens that projects light modulated by the electro-optical device; and a polarization selection surface that selects light of a predetermined polarized component included in the illumination light beam, the polarization selection surface reflects the light toward the electro-optical device, selects light of a predetermined polarized component in the light modulated by the electro-optical device and emits the light toward the projection lens, wherein the direction of polarization beam separation by the polarization conversion element is in an X-axis direction, when a plane defined by a normal line of a polarization selection surface and a central axis of the illumination light beam is assumed to be a plane of incidence, a direction parallel to the plane of incidence and perpendicularly intersecting the central axis is defined as the X-axis direction, and a direction perpendicularly intersecting the plane of incidence is defined as the Y-axis direction, the electro-optical device being a reflective-type liquid crystal device disposed at a position on which either light transmitted or reflected by the polarization selection surface is incident, modulating the incident light, and emitting the modulated light from the plane of incidence of the light, the light beam dividing optical element being configured so as to narrow spacings of a plurality of light source images in the Y-axis direction.

2. The projector as claimed in claim 1, the light beam dividing optical element being a rod that reflects light incident from an incident end surface at a plurality of pairs of reflection surfaces, that divides the light according to differences in reflection positions, and that emits the light as a plurality of partial light beams from an emission end surface, and the rod being disposed so that a spacing of a pair of the reflection surfaces opposing in the Y-axis direction is gradually widened from the incident end surface toward the emission end surface.

3. The projector as claimed in claim 2, the rod being disposed so that a spacing of a pair of the reflection surfaces facing in the X-axis direction is gradually narrowed from the incident end surface toward the emission end surface.

4. The projector as claimed in claim 2, the emission end surface of the rod having a shape substantially similar to a shape of a display area of the electro-optical device.

5. The projector as claimed in claim 2, the rod being composed of a solid light-guiding member consisting of a light-guiding material.

6. The projector as claimed in claim 2, the rod being composed of a hollow light-guiding member having a light-reflecting surface formed on an inside surface of a cylindrical member.

7. The projector as claimed in claim 1, the light beam dividing optical element being a lens array composed of a plurality of condenser lenses aligned in the X-axis direction and the Y-axis direction.

8. The projector as claimed in claim 7, the plurality of condenser lenses having shapes substantially similar to a shape of a display area of the electro-optical device.

9. The projector as claimed in claim 7, the plurality of condenser lenses including a decentered lens.

10. The projector as claimed in claim 7, further comprising a reducing optical system that reduces an overall cross sectional size of the illumination light beam in the Y-axis direction disposed between the light source and the polarization conversion element.

11. The projector as claimed in claim 10, the reducing optical system further reducing the overall cross sectional size of the illumination light beam also in the X-axis direction.

12. The projector as claimed in claim 10, the reducing optical system comprising at least one convex lens disposed on one of the incident side and the emission side of the light beam dividing optical element, and at least one concave lens disposed on the incident side of the polarization conversion element.

13. The projector as claimed in claim 12, at least one of the convex lens and the concave lens being formed by a combination of two or more lenses.

14. The projector as claimed in claim 1, the polarization conversion element including a polarization beam separation film that transmits one polarized light beam and that reflects another polarized light beam in two types of polarized light beams, a reflecting film that reflects the other polarized light beam, and a retardation film that unifies the directions of polarization of the two types of polarized light beams in order to unify directions of emission of the two types of the polarized light beams.

15. A projector, comprising:
    a light beam dividing optical element that divides light from a light source into a plurality of partial light beams;
    a polarization conversion element that converts the plurality of partial light beams into one type of polarized light beam polarized substantially in same directions;
    an electro-optical device that modulates an illumination light beam emitted from the polarization conversion element;
    a projection lens that projects light modulated by the electro-optical device; a polarization selection surface that selects light of a predetermined polarized component included in the illumination light beam, the polarization selection surface reflects the light toward the electro-optical device, selects light of a predetermined polarized component in the light modulated by the electro-optical device and emits the light toward the projection lens; and
    a reducing optical system that reduces an overall cross sectional size of the illumination light beam in the Y-axis direction disposed between the polarization conversion element and the polarization selection surface,
    wherein the direction of polarization beam separation by the polarization conversion element is in an X-axis direction, when a plane defined by a normal line of a polarization selection surface and a central axis of the illumination light beam is assumed to be a plane of incidence, a direction parallel to the plane of incidence and perpendicularly intersecting the central axis is defined as the X-axis direction, and a direction perpendicularly intersecting the plane of incidence is defined as the Y-axis direction.

16. The projector as claimed in claim 15, the reducing optical system further reducing the overall cross sectional size of the light beam consisting of a plurality of partial light beams in the X-axis direction.

17. The projector as claimed in claim 15, the reducing optical system being a combined lens formed by using at least one or more concave lenses.

18. The projector as claimed in claim 15, the reducing optical system being composed of a cylindrical lens.

* * * * *